(12) United States Patent
Kimn et al.

(10) Patent No.: US 10,121,449 B2
(45) Date of Patent: Nov. 6, 2018

(54) METHOD AND APPARATUS FOR SCREEN SHARING

(71) Applicant: Samsung Electronics Co., Ltd., Gyeonggi-do (KR)

(72) Inventors: Soung-Kwan Kimn, Gyeonggi-do (KR); Su-Hyun Kim, Gyeonggi-do (KR); Dong-Hyun Jo, Seoul (KR); Dae-Sik Hwang, Daegu (KR); Seung-Ryong Kook, Gyeonggi-do (KR); Jong-Kyu Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/591,243

(22) Filed: Jan. 7, 2015

(65) Prior Publication Data

US 2015/0193187 A1    Jul. 9, 2015

(30) Foreign Application Priority Data

Jan. 8, 2014    (KR) ........................ 10-2014-0002484

(51) Int. Cl.
*G06F 3/14*    (2006.01)
*G09G 5/00*    (2006.01)

(52) U.S. Cl.
CPC ........... *G09G 5/006* (2013.01); *G06F 3/1454* (2013.01); *G09G 2340/0407* (2013.01);
(Continued)

(58) Field of Classification Search
CPC ...... G06F 1/1616–1/1618; G06F 1/162; G06F 1/1641
(Continued)

(56) References Cited

U.S. PATENT DOCUMENTS

2006/0126812 A1    6/2006  Carlson et al.
2007/0222779 A1*   9/2007  Fastert ...................... G06T 1/00
                                                                345/418
(Continued)

FOREIGN PATENT DOCUMENTS

CN        1787530 A     6/2006
CN      102118533 A     7/2011
(Continued)

OTHER PUBLICATIONS

Yoon, et al.; "Classification of N-Screen Services and its Standardization"; Feb. 19-22, 2012; Electronics & Telecommunications Research Institute; Daejeon, Korea.
(Continued)

*Primary Examiner* — Carolyn R Edwards
(74) *Attorney, Agent, or Firm* — Cha & Reiter, LLC.

(57) ABSTRACT

An electronic device is provided comprising a processor configured to: identify one or more sink devices; for each sink device, generate a respective display data structure; for each sink device, generate a respective data stream, the respective data stream being generated by encoding content produced by one or more applications based on the respective display data structure of the sink device; and transmit, to each of the sink devices, that sink device's respective encoded data stream.

20 Claims, 13 Drawing Sheets

(52) U.S. Cl.
CPC . *G09G 2340/0492* (2013.01); *G09G 2360/18* (2013.01); *G09G 2370/022* (2013.01); *G09G 2370/025* (2013.01); *G09G 2370/042* (2013.01); *G09G 2370/10* (2013.01); *G09G 2370/12* (2013.01); *G09G 2370/16* (2013.01)

(58) Field of Classification Search
USPC .................................................. 345/156–184
See application file for complete search history.

(56) References Cited

U.S. PATENT DOCUMENTS

| | | | |
|---|---|---|---|
| 2008/0247128 A1* | 10/2008 | Khoo | G06F 1/1616 361/679.04 |
| 2008/0288576 A1* | 11/2008 | Carlson | H04L 51/14 709/202 |
| 2010/0262673 A1 | 10/2010 | Chang et al. | |
| 2011/0154205 A1* | 6/2011 | Kim | G08C 17/02 715/733 |
| 2012/0040719 A1* | 2/2012 | Lee | G06F 1/1626 455/557 |
| 2012/0042102 A1 | 2/2012 | Chung et al. | |
| 2012/0320250 A1* | 12/2012 | Kitamori | H04N 5/772 348/333.06 |
| 2014/0092047 A1* | 4/2014 | Nara | G01C 21/3688 345/173 |

FOREIGN PATENT DOCUMENTS

| | | |
|---|---|---|
| CN | 102377877 A | 3/2012 |
| CN | 102883134 A | 1/2013 |
| CN | 103155425 A | 6/2013 |
| EP | 2 336 995 A2 | 6/2011 |
| EP | 2 669 788 A1 | 12/2013 |
| KR | 10-1253492 B1 | 4/2013 |
| KR | 10-2013-0109361 A | 10/2013 |
| WO | 2013/168963 A1 | 11/2013 |

OTHER PUBLICATIONS

European Search Report, dated May 26, 2017.
European Search Report dated Dec. 5, 2017.
Chinese Search Report dated Jul. 6, 2018.
European Search Report dated Aug. 6, 2018.

* cited by examiner

METHOD AND APPARATUS FOR SCREEN SHARING

CLAIM OF PRIORITY

This application claims priority under 35 U.S.C. § 119 to a Patent Application filed in the Korean Intellectual Property Office on Jan. 8, 2014 and assigned Serial number 10-2014-0002484, the entire contents of which are incorporated herein by reference.

BACKGROUND

1. Technical Field

The present disclosure relates to electronic devices, and more particularly, to a method and apparatus for screen sharing.

2. Description of the Related Art

With the growth of Information Telecommunication (IT) technologies and semiconductor technologies, a variety of electronic devices are evolving into multimedia devices providing various multimedia services. For example, the electronic devices may provide multimedia services such as a voice telephony service, a video telephony service, a messenger service, a broadcasting service, a wireless Internet service, a camera service, and a music playback service.

SUMMARY

In recent years, a mobile device (for instance, a smart phone) is providing video transmission, Internet screen transmission, game screen transmission and the like from one multimedia device to a plurality of multimedia devices, thereby realizing a multi-screen service (N-screen). As the mobile device shared a screen through several multimedia devices, it got to require landscape mode or portrait mode screen display adaptive to the screen transmitted to the respective multimedia devices.

According to aspects of the disclosure, an electronic device is provided comprising a processor configured to: identify one or more sink devices; for each sink device, generate a respective display data structure; for each sink device, generate a respective data stream, the respective data stream being generated by encoding content produced by one or more applications based on the respective display data structure of the sink device; and transmit, to each of the sink devices, that sink device's respective encoded data stream.

According to aspects of the disclosure, a method is provided comprising: identifying, by a source device, a first sink device; generating a first display data structure; encoding at least a portion of content corresponding to one or more applications running on the source device to produce a first data stream, the first data stream being generated based on the first display data structure; and transmitting the first data stream to the first sink device.

According to aspects of the disclosure, an electronic device comprising a processor configured to: identify a first sink device; generate a first display data structure; encode at least a portion of content corresponding to one or more applications to produce a first data stream, the first data stream being generated based on the first display data structure; and transmit the first data stream to the first sink device.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

An electronic device according to the present disclosure may be a device including a telecommunication function. For example, the electronic device may be one or a combination of two or more of various electronic devices such as a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, an electronic bracelet, an electronic necklace, an appcessory, a camera, a wearable device, an electronic clock, a wrist watch, a smart home appliance (e.g., a refrigerator, an air conditioner, a cleaner, an artificial intelligence robot, a television (TV), a Digital Video Disk (DVD) player, an audio system, an oven, a microwave, a washing machine, an air cleaner, an electronic frame, and the like), various medical instruments (e.g., Magnetic Resonance Angiography (MRA), Magnetic Resonance Imaging (MRI), Computerized Tomography (CT), a moving-camera, an ultrasonic machine and the like), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, an electronic equipment for ship (e.g., a navigation device for ship, a gyrocompass and the like), avionics, a security instrument, electronic clothes, an electronic locking system, a camcorder, a game console, a Head-Mounted Display (HMD), a flat panel display device, an electronic album, part of a furniture or building/structure including a telecommunication function, an electronic board, an electronic signature receiving device, a projector, or the like. It is apparent to those skilled in the art that the electronic device according to the present disclosure is not limited to the aforementioned instruments.

Figure 1:
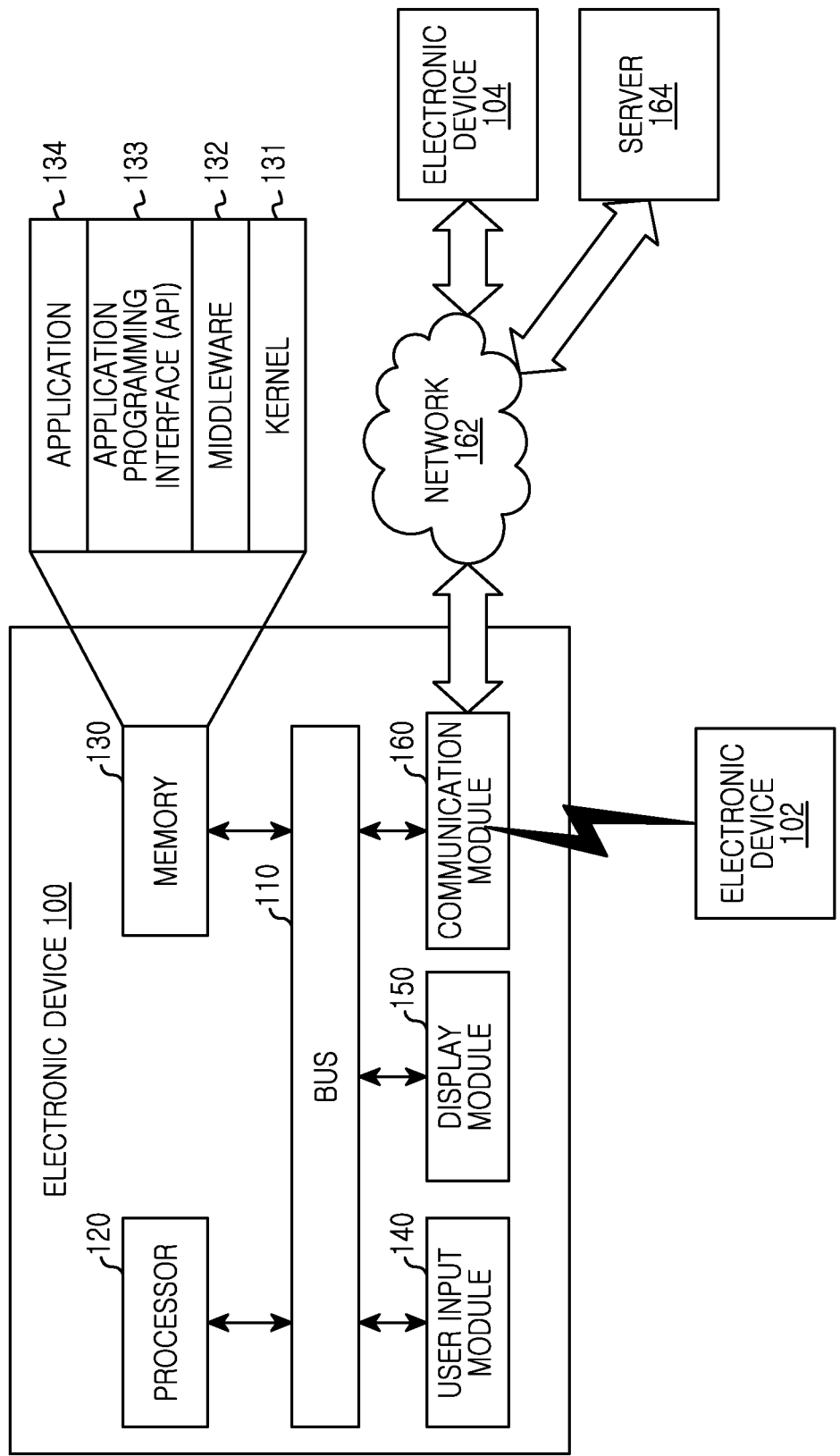
FIG. 1 is a diagram of an example of a system, according to aspects of the disclosure.

FIG. 1 is a diagram of an example of an electronic device, according to aspects of the disclosure.

Referring to FIG. 1, the electronic device 100 may include a bus 110, a processor 120, a memory 130, a user input module 140, a display module 150, or a communication module 160.

The bus 110 may be a circuit coupling the aforementioned constituent elements with one another, and forwarding communication (e.g., control message) between the aforementioned constituent elements.

The processor 120 may, for example, receive instructions from the aforementioned other constituent elements (e.g., the memory 130, the user input module 140, the display module 150, the communication module 160, and the like) through the bus 110, decipher the received instructions, and execute operation or data processing according to the deciphered instructions.

The memory 130 may store an instruction or data which is received from the processor 120 or the other constituent elements (e.g., the user input module 140, the display module 150, the communication module 160, and the like) or is generated by the processor 120 or the other constituent elements. The memory 130 may include, for example, programming modules such as a kernel 131, a middleware 132, an Application Programming Interface (API) 133, applications 134 or the like. The aforementioned programming modules each may be comprised of software, firmware, hardware or a combination of at least two or more of them.

The kernel 131 may control or manage system resources (e.g., the bus 110, the processor 120, the memory 130 or the like) used for executing operations or functions implemented in the remnant other programming modules, for example, the middleware 132, the API 133, or the applications 134. Also, the kernel 131 may provide an interface of enabling the middleware 132, the API 133, or the applications 134 to connect and control or manage the individual constituent element of the electronic device 100.

The middleware 132 may perform a relay role of enabling the API 133 or the applications 134 to communicate and exchange data with the kernel 131. Also, in relation with work requests received from the (plurality of) applications 134, the middleware 132 may, for example, perform load balancing for the work request using a method of allotting at least one application among the (plurality of) applications 134 priority order capable of using the system resources (e.g., the bus 110, the processor 120, the memory 130 or the like) of the electronic device 100 and the like.

The API 133 is an interface of enabling the applications 134 to control a function provided by the kernel 131 or the middleware 132. The API 133 may include, for example, at least one interface or function for file control, window control, image processing, character control or the like.

The user input module 140 may, for example, receive an input of an instruction or data from a user and forward the instruction or data to the processor 120 or the memory 130 through the bus 110. The display module 150 may display an image, a video, data or the like to the user.

The communication module 160 may establish communication between the electronic device 100 and another electronic device 102. The communication module 160 may support a certain short-range communication protocol (e.g., Wireless Fidelity (WiFi), Bluetooth (BT), or Near Field Communication (NFC)) or a certain network communication 162 (e.g., the Internet, a Local Area Network (LAN), a Wide Area Network (WAN), a telecommunication network, a cellular network, a satellite network, a Plain Old Telephone System (POTS) or the like). The electronic devices 102 and 104 each may be the same (e.g., same-type) device as the electronic device 100 or may be a different (e.g., different-type) device.

Figure 2:
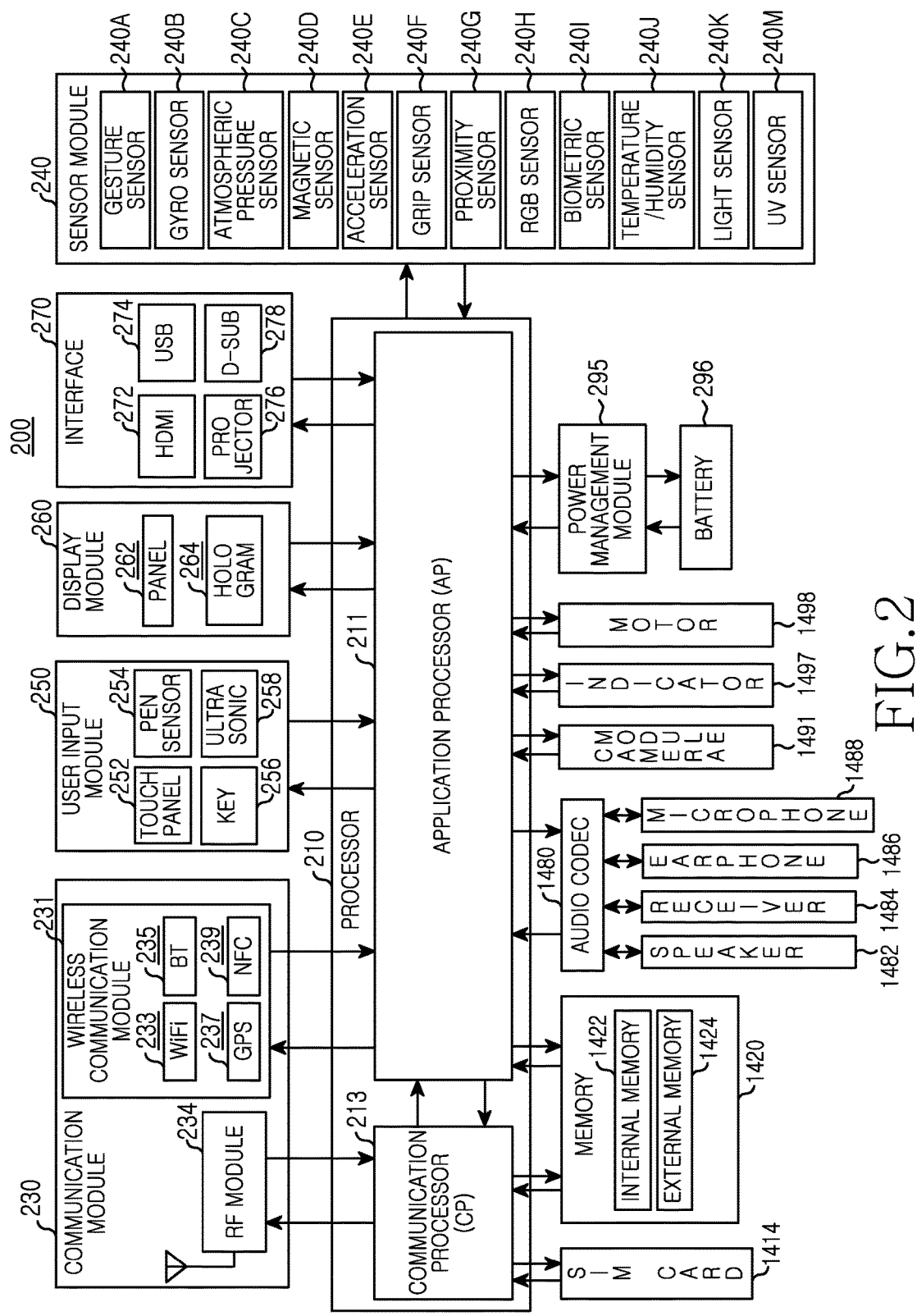
FIG. 2 is a diagram of an example of an electronic device architecture, according to aspects of the disclosure.

FIG. 2 is a diagram of an example of an electronic device architecture 200, according to aspects of the disclosure. The architecture 200 may be, for example, of the electronic device 100 illustrated in FIG. 1.

Referring to FIG. 2, the hardware 200 include one or more processors 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, or a motor 298.

The processor 210 may include any suitable type of processing circuitry, such as a general-purpose processor (e.g., an ARM-based processor), a Field-Programmable Gate Array (FPGA), an Application-Specific Integrated Circuit (ASIC), etc. In some implementations, the processor 210 (e.g., the processor 120) may include one or more Application Processors (APs) 211 or one or more Communication Processors (CPs) 213. In some implementations, the processor 210 may be, for example, the processor 120 illustrated in FIG. 1. FIG. 2 illustrates that the AP 211 and the CP 213 are included within the processor 210, but the AP 211 and the CP 213 may be included within different IC packages, respectively. In one aspect, the AP 211 and the CP 213 may be included within one IC package. In the present disclosure, the processor 210 may set up a display session from negotiated resolution information, audio codec information and video codec information, and create display information to be outputted to a $2^{nd}$ electronic device, and fix a screen mode to be displayed to the $2^{nd}$ electronic device, to any one orientation among landscape orientation or portrait orientation.

The AP 211 may drive an operating system or an application program and control a plurality of hardware or software constituent elements coupled to the AP 211, and perform processing and operations of various data including multimedia data. The AP 211 may be, for example, implemented as a System on Chip (SoC). According to aspects of the disclosure, the processor 210 may further include a Graphic Processing Unit (GPU) (not shown).

The CP 213 may perform a function of managing a data link and converting a communication protocol in a communication between an electronic device (e.g., the electronic device 100) including the hardware 200 and another electronic device 104 coupled through a network 162. The CP 213 may be implemented as a SoC, for example. According to aspects of the disclosure, the CP 213 may perform at least part of a multimedia control function. The CP 213 may perform terminal distinction and authentication within a communication network, using a subscriber identity module (e.g., the SIM card 214). Also, the CP 213 may provide services such as voice telephony, video telephony, a text message, packet data or the like to a user.

Also, the CP 213 may control data transmission/reception of the communication module 230. FIG. 2 illustrates the constituent elements such as the CP 213, the power management module 295, the memory 220 or the like as constituent elements separate from the AP 211 but, according to aspects of the disclosure, the AP 211 may be implemented to include at least some (e.g., the CP 213) of the aforementioned constituent elements.

According to aspects of the disclosure, the AP 211 or the CP 213 may load to a volatile memory an instruction or data received from a non-volatile memory coupled to each of the AP 211 and the CP 213 or at least one of other constituent elements, and process the loaded instruction or data. Also, the AP 211 or the CP 213 may store in the non-volatile memory data received from at least one of the other constituent elements or generated by at least one of the other constituent elements.

The SIM card 214 may be a card implementing the subscriber identity module, and may be inserted into a slot provided in a specific location of the electronic device 100. The SIM card 214 may include unique identification information (e.g., Integrated Circuit Card ID (ICCID)) or subscriber information (e.g., International Mobile Subscriber Identity (IMSI)).

The memory 220 may include an internal memory 222 or an external memory 224. The memory 220 may be, for example, the memory 130 illustrated in FIG. 1. The internal memory 222 may include, for example, at least one of a volatile memory (e.g., a Dynamic Random Access Memory (DRAM), a Static Random Access Memory (SRAM), a Synchronous Dynamic Random Access Memory (SDRAM) and the like) or a non-volatile memory (e.g., a One Time PROM (OTPROM), a Programmable ROM (PROM), an Erasable Programmable ROM (EPROM), an Electrically Erasable Programmable ROM (EEPROM), a mask Read Only Memory (ROM), a flash ROM, a Not AND (NAND) flash memory, a Not OR (NOR) flash memory and the like). According to aspects of the disclosure, the internal memory 222 may take a form of Solid State Drive (SSD). The external memory 224 may further include, for example, Compact Flash (CF), Secure Digital (SD), Micro Secure Digital (Micro-SD), Mini Secure Digital (Mini-SD), extreme Digital (xD), a memory stick or the like.

The communication module 230 may include a wireless communication module 231 or a Radio Frequency (RF) module 234. The communication module 230 may be, for example, the communication module 160 illustrated in FIG. 1. The wireless communication module 231 may include, for example, WiFi 233, BT 235, GPS 237 or NFC 239. For example, the wireless communication module 231 may provide a wireless communication function using radio frequency. Additionally or alternatively, the wireless communication module 231 may include a network interface (e.g., a LAN card) for coupling the hardware 200 with a network (e.g., the Internet, a LAN, a WAN, a telecommunication network, a cellular network, a satellite network, a POTS or the like), a modem or the like. In the present disclosure, the communication module 231 may transmit $1^{st}$ screen mode information of at least one screen that is being displayed in a $1^{st}$ electronic device, to the $2^{nd}$ electronic device, and receive a request for change of the transmitted $1^{st}$ screen mode information from the $2^{nd}$ electronic device, and transmit a $2^{nd}$ screen mode changing the $1^{st}$ screen mode to the $2^{nd}$ electronic device. Also, the communication module 231 may exchange at least one information among resolution information, audio codec information, and video codec information to be displayed to the $2^{nd}$ electronic device, with the $2^{nd}$ electronic device through a session negotiation. Also, the communication module 231 may transmit in real time video data and audio data dependent on the $2^{nd}$ screen mode, and may capture and encode composed screen data and transmit the encoding result to the selected $2^{nd}$ electronic device. Also, the communication module 231 may receive from the $1^{st}$ electronic device $1^{st}$ screen mode information of at least one screen that is being displayed in the $1^{st}$ electronic device, and send the $1^{st}$ electronic device a request for change of the received $1^{st}$ screen mode information. Also, the communication module 231 may exchange at least one information among resolution information, audio codec information and video codec information to be displayed to the $1^{st}$ electronic device, with the $1^{st}$ electronic device through a session negotiation. Also, the communication module 231 may receive from the $1^{st}$ electronic device data about at least one screen that is being displayed in the $1^{st}$ electronic device, and receive in real time video data and audio data dependent on the $2^{nd}$ screen mode.

The RF module 234 may take charge of transmission/reception of data, for example, transmission/reception of an RF signal or a called electric signal. The RF module 234 may include, though not illustrated, for example, a transceiver, a Power Amp Module (PAM), a frequency filter, a Low Noise Amplifier (LNA) or the like. Also, the RF module 234 may further include a component for transmitting/receiving an electromagnetic wave on a free space in a wireless communication, for example, a conductor, a conducting wire or the like.

The sensor module 240 may include, for example, at least one of a gesture sensor 240A, a gyro sensor 240B, an air pressure sensor 240C, a magnetic sensor 240D, an acceleration sensor 240E, a grip sensor 240F, a proximity sensor 240G, a Red Green Blue (RGB) sensor 240H, a bio-physical sensor 240I, a temperature/humidity sensor 240J, an illumination sensor 240K, or a Ultraviolet (UV) sensor 240M. The sensor module 240 may measure a physical quantity or sense an activation state of the electronic device 100 and convert the measured or sensed information into an electrical signal. Additionally or alternatively, the sensor module 240 may include, for example, an Electronic nose (E-nose) sensor (not shown), an Electromyography (EMG) sensor (not shown), an Electroencephalogram (EEG) sensor (not shown), an Electrocardiogram (ECG) sensor (not shown), a fingerprint sensor (not shown) or the like. The sensor module 240 may further include a control circuit for controlling at least one or more sensors provided therein.

The user input module 250 may include a touch panel 252, a (digital) pen sensor 254, a key 256, or an ultrasonic input device 258. The user input module 250 may be, for example, the user input module 140 illustrated in FIG. 1. The touch panel 252 may recognize, for example, a touch input in at least one method among a capacitive method, a pressure sensitive method, an infrared method, or an ultrasonic method. Also, the touch panel 252 may also further include a controller (not shown). In the capacitive method, proximity recognition as well as direct touch is possible. The touch panel 252 may also further include a tactile layer. In this case, the touch panel 252 may provide a tactile response to a user.

The (digital) pen sensor 254 may be implemented, for example, using a method being the same or similar to a method of receiving a user's touch input or a separate recognizing sheet. The key 256 may be, for example, a keypad or a touch key. The ultrasonic input device 258 is a device capable of identifying data by sensing a sound wave with a microphone (e.g., a microphone 288) of the electronic device through a pen generating an ultrasonic signal, and may perform wireless recognition. According to aspects of the disclosure, the hardware 200 may also receive a user input from an external device (e.g., a network, a computer, or a server) coupled to the hardware 200 using the communication module 230.

The display module 260 may include a panel 262 or a hologram 264. The display module 260 may be, for example, the display module 150 illustrated in FIG. 1. The panel 262 may be, for example, a Liquid Crystal Display (LCD), an Active-Matrix Organic Light-Emitting Diode (AMOLED), or the like. The panel 262 may be implemented to be flexible, transparent, or wearable, for example. The panel 262 may be also constructed as one module together with the touch panel 252. The hologram 264 may show a three-dimensional image in the air by using interference of light. According to aspects of the disclosure, the display module 260 may further include a control circuit for controlling the panel 262 or the hologram 264. In the present disclosure, the display module 260 may display in real time at least one screen based on received data.

The interface 270 may include, for example, a High-Definition Multimedia Interface (HDMI) 272, a Universal Serial Bus (USB) 274, a projector 276, or a D-subminiature (D-sub) 278. Additionally or alternatively, the interface 270 may include, for example, Secure Digital/Multi Media Card (SD/MMC) (not shown) or Infrared Data Association (IrDA) (not shown).

The audio codec 280 may convert a voice and an electric signal interactively. The audio codec 280 may convert, for example, voice information that is inputted or outputted through a speaker 282, a receiver 284, an earphone 286, the microphone 288, or the like.

The camera module 291 is a device capable of taking a picture and a video. According to aspects of the disclosure, the camera module 291 may include one or more image sensors (e.g., front lenses or rear lenses), an Image Signal Processor (ISP) (not shown), or a flash LED (not shown).

The power management module 295 may manage electric power of the hardware 200. Though not illustrated, the power management module 295 may include, for example, a Power Management Integrated Circuit (PMIC), a charger Integrated Circuit (IC), or a battery fuel gauge.

The PMIC may be mounted, for example, within an integrated circuit or a SoC semiconductor. A charging method may be divided into a wired charging method and a wireless charging method. The charger IC may charge a battery, and may prevent the inflow of overvoltage or overcurrent from an electric charger. According to aspects of the disclosure, the charger IC may include a charger IC for at least one of the wired charging method or the wireless charging method. As the wireless charging method, there are a magnetic resonance method, a magnetic induction method, an electromagnetic wave method or the like, for example. Supplementary circuits for wireless charging, for example, circuits such as a coil loop, a resonance circuit, a rectifier and the like may be added.

The battery fuel gauge may measure, for example, a level of the battery 296, a charging voltage thereof, a charging electric current thereof, or a charging temperature thereof. The battery 296 may generate electricity and supply a power source. The battery 296 may be, for example, a rechargeable battery.

The indicator 297 may indicate a specific state of the hardware 200 or a part (e.g., the AP 211) thereof, for example, a booting state, a message state, a charging state or the like. The motor 298 may convert an electrical signal into a mechanical vibration. A Microcontroller Unit (MCU) may control the sensor module 240.

Though not illustrated, the hardware 200 may include a processing device (e.g., a GPU) for mobile TV support. The processing device for mobile TV support may process, for example, standard media data of Digital Multimedia Broadcasting (DMB), Digital Video Broadcasting (DVB), a media flow or the like.

The names of the aforementioned constituent elements of the hardware 200 according to the present disclosure may be different in accordance to the kind of the electronic device. The hardware 200 according to the present disclosure may include at least one of the aforementioned constituent elements, and may omit some constituent elements or further include additional other constituent elements. Also, some of the constituent elements of the hardware 200 according to the present disclosure are combined and constructed as one entity, thereby being able to identically perform the functions of the corresponding constituent elements before combination.

Figure 3:
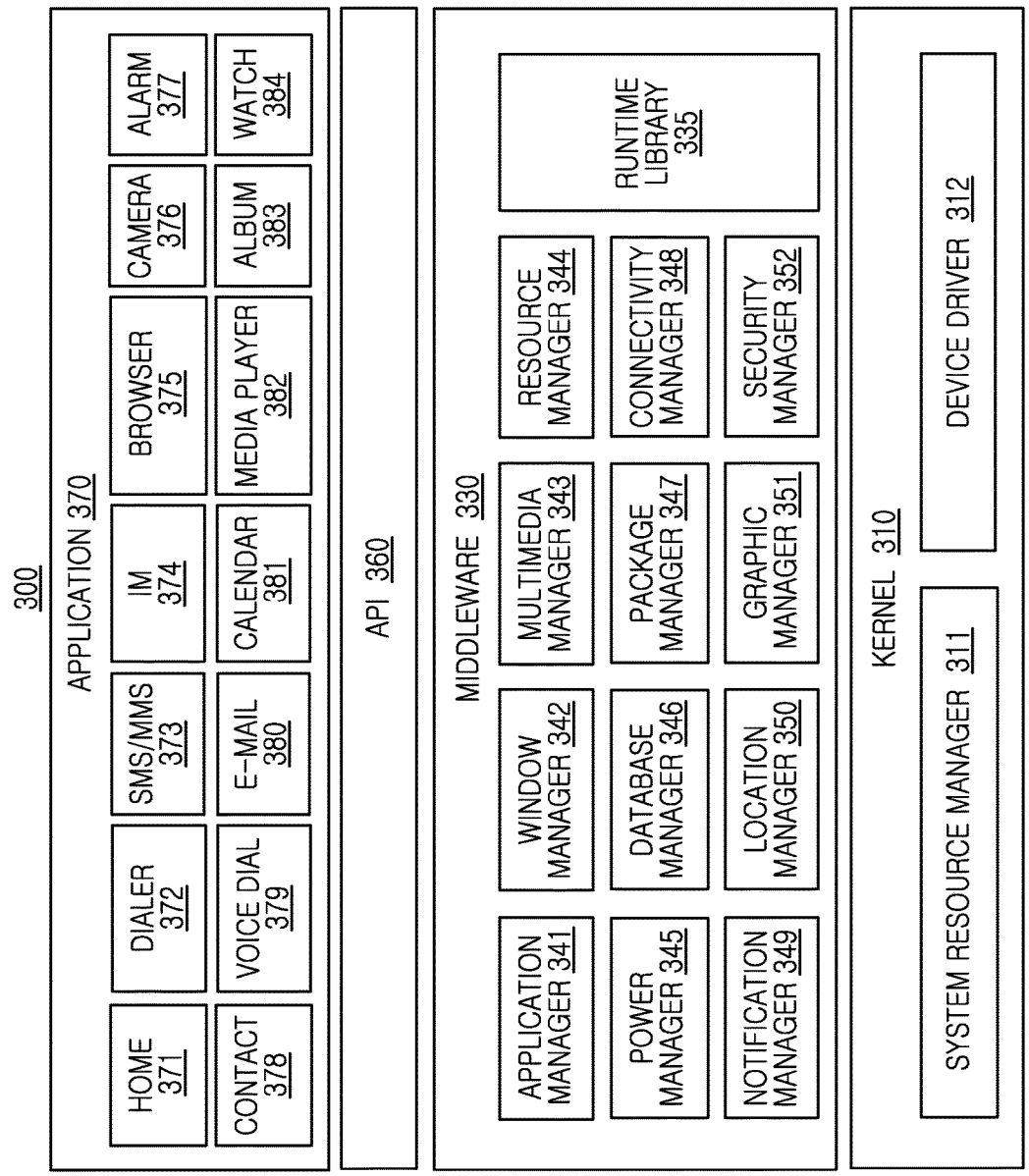
FIG. 3 is a block diagram illustrating a construction of a programming module, according to aspects of the disclosure.

FIG. 3 is a block diagram illustrating a construction of a programming module, according to aspects of the disclosure.

The programming module 300 may be included (e.g., stored) in the electronic device 100 (e.g., the memory 130) illustrated in FIG. 1. At least part of the programming module 300 may be comprised of software, firmware, hardware, or a combination of at least two or more of them. The programming module 300 may include an Operating System (OS) which is implemented in hardware (e.g., the hardware 200) and controls resources related to the electronic device (e.g., the electronic device 100), or various applications (e.g., the application 370) which are run in the operating system. For example, the operating system may be Android, iPhone OS (iOS), Windows, Symbian, Tizen, Bada, or the like. Referring to FIG. 3, the programming module 300 may include a kernel 310, a middleware 330, an API 360, or an application 370.

The kernel 310 (e.g., the kernel 131) may include a system resource manager 311 or a device driver 312. The system resource manager 311 may include, for example, a process management unit, a memory management unit, a file system management unit, or the like. The system resource manager 311 may perform control of a system resource, allocation thereof, recovery thereof, or the like. The device driver 312 may include, for example, a display driver, a camera driver, a Bluetooth driver, a shared memory driver, a USB driver, a keypad driver, a WiFi driver, or an audio driver. Also, according to aspects of the disclosure, the device driver 312 may include an Inter-Process Communication (IPC) driver (not shown).

The middleware 330 may include a plurality of modules previously implemented to provide functions commonly required by the applications 370. Also, the middleware 330 may provide the functions to the applications 370 through the API 360 such that the applications 370 may make efficient use of restricted system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is run. According to aspects of the disclosure, the runtime library 335 may perform a function of input/output, memory management, arithmetic function or the like.

The application manager 341 may manage, for example, a life cycle of at least one application among the applications 370. The window manager 342 may manage a GUI resource used in a screen. The multimedia manager 343 may grasp a format necessary for playback of various media files, and perform encoding or decoding of the media file using a codec adapted to the corresponding format. The resource manager 344 may manage a resource such as a source code of at least any one application among the applications 370, a memory thereof, a storage space thereof, or the like.

The power manager 345 may operate together with a Basic Input/Output System (BIOS) and the like and manage a battery or power source, and provide electric power information and the like necessary for the operation. The database manager 346 may manage to create, search or change a database that will be used in at least one application among the applications 370. The package manager 347 may manage installation or updating of an application which is distributed in a form of a package file.

The connectivity manager 348 may manage, for example, wireless connectivity such as WiFi, Bluetooth or the like. The notification manager 349 may display or notify an event such as an arrival message, an appointment, a proximity notification and the like in a way not disturbing a user. The location manager 350 may manage location information of the electronic device. The graphic manager 351 may manage a graphic effect to be provided to the user or a user interface related to this. The security manager 352 may provide a general security function necessary for system security, user authentication or the like. According to aspects of the disclosure, if the electronic device (e.g., the electronic device 100) has a phone function, the middleware 330 may further include a telephony manager (not shown) for managing a voice or video telephony function of the electronic device.

The middleware 330 may create and use a new middleware module through a combination of various functions of the aforementioned internal constituent element modules. The middleware 330 may provide a module that is specialized by kind of the operating system to provide a differentiated function. Also, the middleware 330 may dynamically delete some of the existing constituent elements or add new constituent elements. Accordingly, the middleware 330 may omit some of the constituent elements stated in an exemplary embodiment of the present disclosure or further include other constituent elements or substitute other constituent elements with constituent elements of different names performing similar functions.

The API 360 (e.g., the API 133), a set of API programming functions, may be provided to have a different construction in accordance to the operating system. For example, in a case of Android or iOS, it may, for example, provide one API set by platform and, in a case of Tizen, it may, for example, provide two or more API sets by platform.

The applications 370 (e.g., the applications 134) may include, for example, a preloaded application or a third party application.

At least part of the programming module 300 may be implemented by using one or more processor-executable instructions stored in a computer-readable storage media. When the instruction is executed by one or more processors (e.g., the processor 210), the one or more processors may perform a function corresponding to the instruction. The computer-readable storage media may be, for example, the memory 260. At least part of the programming module 300 may be, for example, implemented (e.g., executed) by the processor 210. At least part of the programming module 300 may include, for example, a module, a program, a routine, an instruction set, a process or the like for performing one or more functions.

The names of the constituent elements of the programming module (e.g., the programming module 300) according to the present disclosure may be different in accordance to the kind of the operating system. Also, the programming module according to the present disclosure may include at least one or more of the aforementioned constituent elements, omit some of the aforementioned constituent elements, or further include additional other constituent elements.

FIGS. 4A-D are diagrams illustrating an example of a system, according to aspects of the disclosure. As illustrated, the system includes a $1^{st}$ electronic device 401 and a $2^{nd}$ electronic device 402. The $1^{st}$ electronic device and the $2^{nd}$ electronic device may be connected to one another via any suitable type of connection. For example, the $1^{st}$ electronic device and the $2^{nd}$ electronic device may be connected to one another via an Internet Protocol (IP) based network connection, a Universal Serial Bus (USB) connection, a Local Area Network (LAN) connection, a WiFi connection, etc.

In operation, the $1^{st}$ electronic device may receive resolution information compatible with the $2^{nd}$ electronic device, from the $2^{nd}$ electronic device. For example, if resolutions compatible with the $2^{nd}$ electronic device are 'A', 'B', 'C' and 'D' Pixel Per Inch (PPI), the $1^{st}$ electronic device may receive resolution information of the 'A', 'B', 'C' and 'D' PPI being the resolutions compatible with the $2^{nd}$ electronic device, from the $2^{nd}$ electronic device.

Next, the $1^{st}$ electronic device may select any one resolution among the resolution information received from the $2^{nd}$ electronic device. In the aforementioned example, the $1^{st}$ electronic device may select, by a user, the resolution 'A' PPI among the resolution information of the 'A', 'B', 'C' and 'D' PPI received from the $2^{nd}$ electronic device.

After that, the $1^{st}$ electronic device may transmit the selected resolution information to the $2^{nd}$ electronic device such that the $2^{nd}$ electronic device may be set to the selected resolution. In the aforementioned example, the $1^{st}$ electronic device may transmit the resolution information of the 'A' PPI selected by the user to the $2^{nd}$ electronic device.

Next, the $1^{st}$ electronic device may transmit $1^{st}$ rotation information of at least one screen that is being displayed in a display module of the $1^{st}$ electronic device, to the $2^{nd}$ electronic device. For example, the $1^{st}$ rotation information may be screen data information and display angle information.

After that, the $1^{st}$ electronic device may receive an input of an instruction for executing at least one application among a plurality of applications, and display a screen corresponding to the at least one application. Concurrently with this, the $2^{nd}$ electronic device may display in a display module of the $2^{nd}$ electronic device the at least one screen that is being displayed in the display module of the $1^{st}$ electronic device, respectively.

For example, a description is made for a case in which, as illustrated in FIG. 4 A, a $1^{st}$ electronic device 401 receives an input of an instruction for executing a $1^{st}$ application, and displays a $1^{st}$ screen of the $1^{st}$ application in a display module of the $1^{st}$ electronic device 401. In the aforementioned example, a $2^{nd}$ electronic device 402 may display in a set region of a display module of the $2^{nd}$ electronic device 402 the $1^{st}$ screen of the $1^{st}$ application. The $1^{st}$ screen of the 1st application may be displayed concurrently on both the 1st electronic device 401 and the second electronic device 402.

After that, based on the 1st rotation information received from the 1st electronic device, the 2nd electronic device may send the 1st electronic device a request for rotating of any one screen among the at least one screen that is being displayed in the display module of the 2nd electronic device.

Figure 4A:
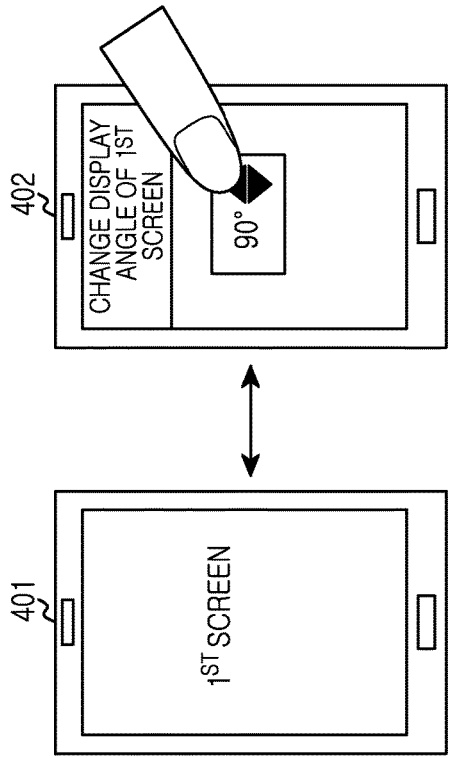
FIG. 4A, FIG. 4B, FIG. 4C and FIG. 4D are diagrams illustrating an example of a system, according to aspects of the disclosure.
Figure 4B:
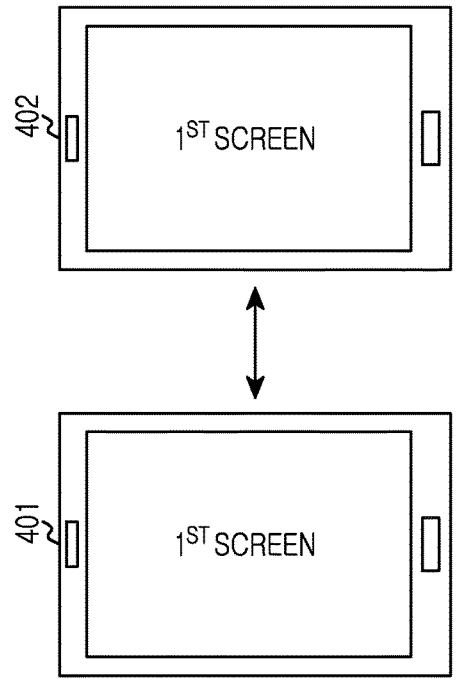

For example, as illustrated in FIG. 4B, the 2nd electronic device 402 may present a menu of changing a display angle of a 1st screen that is being presently displayed in a display module of the 2nd electronic device 402. In the aforementioned example, the 2nd electronic device 402 may receive an input of an instruction for rotating the 1st screen that is being presently displayed in the display module of the 2nd electronic device 402 by 90 degrees to the right (i.e., 270 degrees to the left).

After that, the 1st electronic device may change a resolution of the screen in response to the screen change request. In more detail, to output a changed screen to the display module of the 1st electronic device, the 1st electronic device may change the resolution of the screen into a resolution adapted to the changed screen.

Next, the 1st electronic device may transmit to the 2nd electronic device 2nd rotation information responsive to the received screen change request. For example, the 2nd rotation information may be screen data information about the requested screen based on a resolution that will be changed with a variation of a display angle of the screen having received the screen change request from the 2nd electronic device, and the same display angle information included in the 1st rotation information.

Figure 4C:
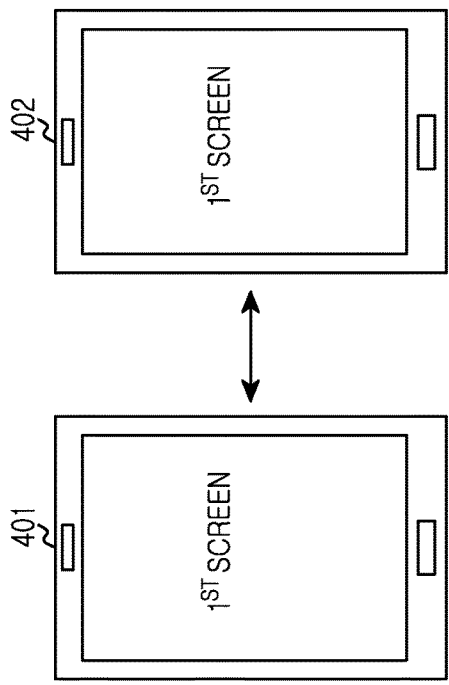

After that, the 1st electronic device may change the requested screen. For example, a description is made for a case in which, as illustrated in FIG. 4C, the 1st electronic device 401 receives from the 2nd electronic device 402 a request for rotating a 1st screen by 90 degrees to the right (i.e., 270 degrees to the left). In the aforementioned example, the 1st electronic device 401 may rotate the 1st screen that is being displayed in the display module of the 1st electronic device 401 by 90 degrees to the right (i.e., 270 degrees to the left).

Figure 4D:
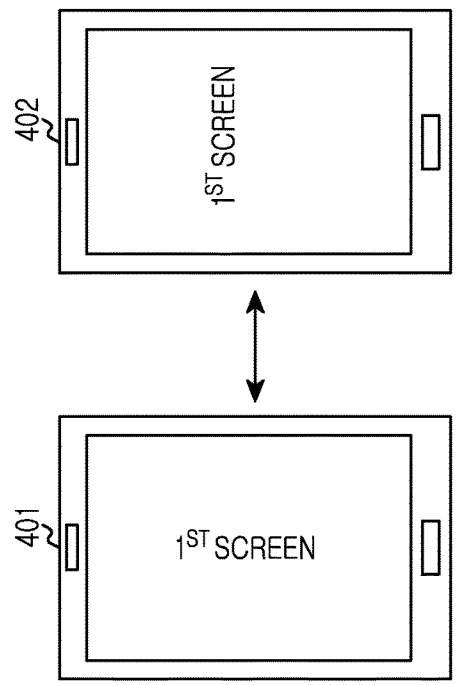

Next, the 2nd electronic device may change a screen based on a 2nd rotation information received from the 1st electronic device. In more detail, the 2nd electronic device may change a display angle of the screen that is being displayed in the display module of the 2nd electronic device into the display angle of the requested screen of the 1st electronic device, based on the 2nd rotation information received from the 1st electronic device. For example, as illustrated in FIG. 4D, the 2nd electronic device 402 may rotate the screen by 90 degrees to the right (i.e., 270 degrees to the left) based on the 2nd rotation information received from the 1st electronic device 401.

Figure 5A:
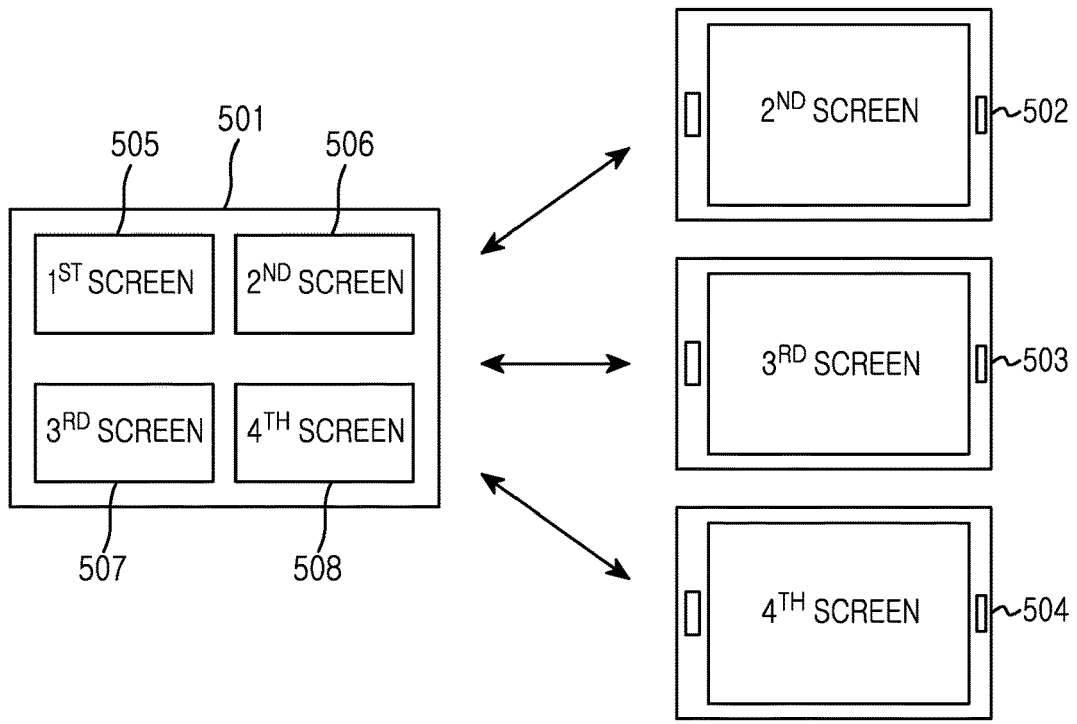
FIG. 5A and FIG. 5B are diagrams illustrating an example of a system, according to aspects of the disclosure.
Figure 5B:
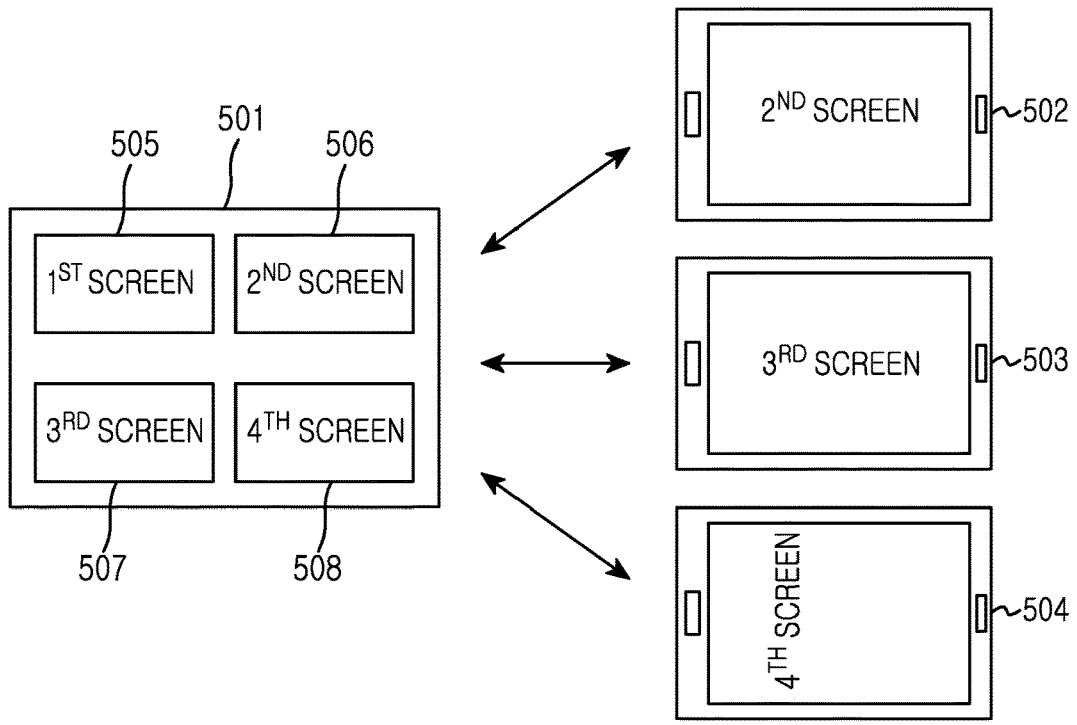

FIGS. 5A-B are diagrams illustrating an example of a system, according to aspects of the disclosure. As illustrated, the system includes a 1st electronic device 501 and a plurality of 2nd electronic devices 502-504. Each of the 2nd electronic devices may be connected to the first electronic device via any suitable type of connection. For example, the 1st electronic device and any of the 2nd electronic devices may be connected to one another via an Internet Protocol (IP) based network connection, a Universal Serial Bus (USB) connection, a Local Area Network (LAN) connection, a WiFi connection, etc.

In operation, the 1st electronic device 501 may receive resolution information compatible with the 2nd electronic devices 502, 503, and 504 from the 2nd electronic devices 502, 503, and 504. For example, if resolutions compatible with the 2nd electronic device 502 are 'A' and 'B' PPI, and resolutions compatible with the 2nd electronic device 503 are 'B' and 'C' PPI, and resolutions compatible with the 2nd electronic device 504 are 'C' and 'D' PPI, the 1st electronic device 501 may receive resolution information of the 'A', 'B', 'C' and 'D' PPI being the resolutions compatible with the 2nd electronic devices 502, 503, and 504, from the respective 2nd electronic devices 502, 503, and 504.

Next, the 1st electronic device 501 may select any one resolution among the resolution information received from the respective 2nd electronic devices 502, 503, and 504. In the aforementioned example, the 1st electronic device 501 may select, by a user, the resolution 'A' PPI among the resolution information of the 'A' and 'B' PPI received from the 2nd electronic device 502.

After that, the 1st electronic device 501 may transmit the selected resolution information to the 2nd electronic devices 502, 503, and 504 such that any of the 2nd electronic devices 502, 503, and 504 can switch to the selected resolution. In the aforementioned example, the 1st electronic device 501 may transmit the resolution information of the 'A' PPI selected by the user to the 2nd electronic device 502.

Next, the 1st electronic device 501 may render a screen of an application that is being executed on the 1st electronic device 501, and select one of the connected 2nd electronic devices 502, 503, and 504 in the application program, and output the screen of the corresponding application to the selected 2nd electronic device. Also, the 1st electronic device 501 may select another application program that is being executed, select another one of the connected 2nd electronic devices 502, 503, and 504, and output a screen of the other selected application to the other selected 2nd electronic device.

Next, the 1st electronic device 501 may transmit to the 2nd electronic devices 502, 503, and 504 1st rotation information of at least one screen 505, 506, 507, and 508 that are being displayed in a display module of the 1st electronic device 501. Here, the 1st rotation information may be screen data information and display angle information about the at least one screen 505, 506, 507, and 508 based on the resolutions set to the respective 2nd electronic devices 502, 503, and 504.

After that, the 1st electronic device 501 may receive an instruction for executing at least one application among a plurality of applications set to the 1st electronic device 501, and display at least one of the screens 505, 506, 507, and 508 as a result of executing the application. Concurrently with the 1st electronic device, each of the 2nd electronic devices 502, 503, and 504 may display a different one of the screens 505, 506, 507, and 508

For example, as illustrated in FIG. 5A, the 1st electronic device 501 may display the 1st screen 505, the 2nd screen 506, the 3rd screen 507, and the 4th screen 508 in the display module of the 1st electronic device 501. In addition, the 2nd screen 506 displayed in the display module of the 1st electronic device 501 may be displayed concurrently (e.g., in real time) in the 2nd electronic device 502. Furthermore, the 3rd screen 507 displayed in the display module of the 1st electronic device 501 may also be displayed in real time in the 2nd electronic device 503. And still furthermore, the 4th screen 508 displayed in the display module of the 1st electronic device 501 may be displayed in real time in the 2nd electronic device 504.

After that, based on the 1st rotation information received from the 1st electronic device 501, any one of the 2nd electronic devices 502, 503, and 504 may send the 1st electronic device 501 a request for changing the current mode of the screen that is displayed on that device.

For example, the $2^{nd}$ electronic device 504 may enter a menu of changing a display angle of the $4^{th}$ screen 508 that is being presently displayed in the display module of the $2^{nd}$ electronic device 504, and receive an input of an instruction for rotating the $4^{th}$ screen 508 that is being presently displayed in the display module of the $2^{nd}$ electronic device 504 by 90 degrees to the left (i.e., 270 degrees to the right).

After that, the $1^{st}$ electronic device 501 may change a resolution of the screen in response to the screen change request. More particularly, to output the screen 508 in the requested orientation, the $1^{st}$ electronic device 501 may also need to change the resolution in which the screen 508 is being output (e.g., to the $2^{nd}$ electronic device or on the display unit of the $1^{st}$ electronic device).

Next, the $1^{st}$ electronic device 501 may transmit to the $2^{nd}$ electronic devices 502, 503, and 504 $2^{nd}$ rotation information responsive to the received screen change request. The $2^{nd}$ rotation information may be screen data information about the requested screen and it may include an indication of the new resolution of the screen 508 when the orientation of the screen 508 is changed in accordance with the instruction for rotating the screen 508. After that, as illustrated in FIG. 5B, the $2^{nd}$ electronic device 504 may display the $4^{th}$ screen 508 in the new orientation, based on the $2^{nd}$ rotation information received from the $1^{st}$ electronic device 501.

Figure 6:
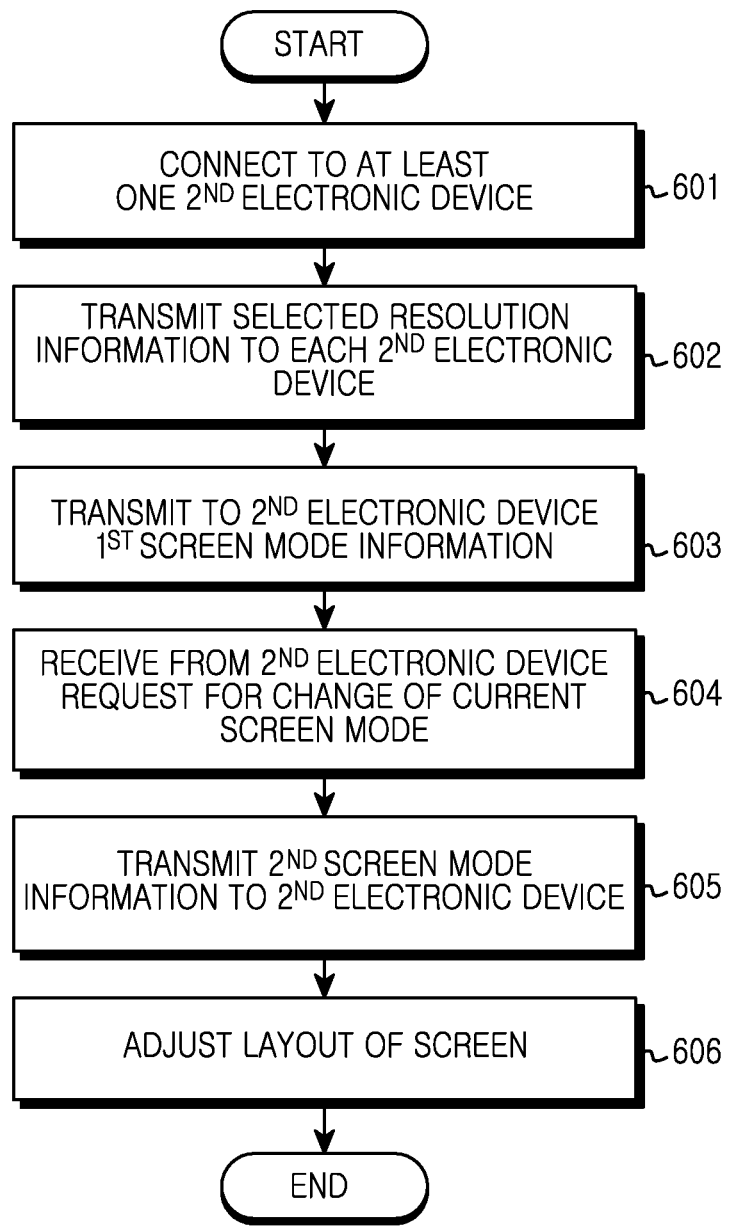
FIG. 6 is a flowchart of an example of a process, according to aspects of the disclosure.

FIG. 6 is a flowchart of an example of a process, according to aspects of the disclosure. As illustrated in FIG. 6, the $1^{st}$ electronic device may identify that it is connected to a network together with at least one $2^{nd}$ electronic device, respectively (Step 601). Below, a detailed description is made of two examples in which the $1^{st}$ electronic device and the $2^{nd}$ electronic device are mutually connected to the network. For description convenience, the $1^{st}$ electronic device is named a source device, and the $2^{nd}$ electronic device is named a sink device. Below, the first example will be described.

First, the source device and the sink device may be connected to a network. The network, in some implementations, may include an IP-based network such as a LAN, WiFi and the like. After that, the source device may perform a device discovery process. For example, the device discovery process may include identifying a terminal responding to a 'discovery packet' transmitted by the source device.

After that, the source device and the sink device may perform a session negotiation process. Here, the session negotiation process may be a process in which the source device and the sink device mutually exchange and negotiate at least one of supported display resolution, codec and control device information. Next, the source device and the sink device may designate at least one of the resolution and codec for use in a communication session (e.g., a screen mirroring session) between the source device and the sink device.

After that, the source device may perform a screen data transfer process of encoding screen/sound data by a set codec and transmitting the encoding result to the sink device. Next, the source device and the sink device may perform a session disconnection process of releasing session connection and a network disconnection process of releasing network connection.

Below, a description is made of the second example in which the source device and the sink device are mutually connected using WiFi Direct. First, the source device may perform a device discovery process. In more detail, the source device may search a device including 'display information session connection information' in information of a scan response message of a WiFi Direct device and then, detect 'device type', 'device status' and session connection information (i.e., Transmission Control Protocol (TCP) port information). The source device and the sink device may perform a network connection process of connecting through a WiFi Direct network.

After that, the source device and the sink device may perform a session negotiation process of mutually exchanging and negotiating supported display resolution, codec and control device information. Next, the source device and the sink device may perform a session connection process of designating a resolution and codec to be used for a session and performing session connection. After that, the source device may perform a screen data transfer process of encoding screen/sound data by a set codec and transmitting the encoding result to the sink device. After that, the source device and the sink device may perform a session disconnection process of releasing session connection and a network disconnection process of releasing network connection.

Next, the $1^{st}$ electronic device may transmit selected resolution information to each $2^{nd}$ electronic device (Step 602). More particularly, the $1^{st}$ electronic device may receive resolution information compatible with the $2^{nd}$ electronic device from the $2^{nd}$ electronic device, and select any one resolution among the received resolution information, and transmit the selected resolution information to the $2^{nd}$ electronic device such that the selected resolution may be set to the $2^{nd}$ electronic device.

After that, the $1^{st}$ electronic device may create a display data structure for sink output. The display data structure may include an indication of one or more characteristics of a screen that is to be output to the $2^{nd}$ electronic device. For example, the display data structure may include one or more of, resolution, color depth, orientation (e.g., landscape orientation or portrait orientation). The logical data structure may include any suitable type of data structure and/or variable that is in some manner used when information corresponding to a particular application (and/or information displayed on the screen of the $1^{st}$ device) is encoded. After that, the $1^{st}$ electronic device may fix the orientation of a capture screen of the logical display. In more detail, the $1^{st}$ electronic device may fix the capture screen of the logical display to landscape orientation or portrait orientation.

Next, the $1^{st}$ electronic device may transmit to the $2^{nd}$ electronic device $1^{st}$ screen mode information of at least one screen that is being displayed in the $1^{st}$ electronic device (Step 603). Here, the $1^{st}$ screen mode information may be screen data information and display angle information about the at least one screen based on the resolution set to the $2^{nd}$ electronic device.

After that, the $1^{st}$ electronic device may receive a request for change of the $1^{st}$ screen mode information from the $2^{nd}$ electronic device (Step 604). For example, the $1^{st}$ electronic device may receive from the $2^{nd}$ electronic device a request for rotating a $1^{st}$ screen that is being presently displayed in a display module of the $2^{nd}$ electronic device by 180 degrees. Next, the $1^{st}$ electronic device may change the logical display data structure to include an indication of the requested screen orientation. In addition, in some implementations, the $1^{st}$ electronic device may further modify the display data structure to include indications of new resolution and color depth values that correspond to the new screen orientation.

Next, the $1^{st}$ electronic device may transmit $2^{nd}$ screen mode information to the $2^{nd}$ electronic device (Step 605).

Here, the $2^{nd}$ screen mode information may be screen data information about the requested screen based on a resolution that will be changed with a variation of a display angle of the screen having received the screen change request from the $2^{nd}$ electronic device, and the same display angle information included in the $1^{st}$ screen mode information. In more detail, if the display angle information included in $1^{st}$ screen mode information is set along landscape orientation of the screen of the $1^{st}$ electronic device, the $1^{st}$ electronic device may transmit the display angle information of the landscape orientation screen to the $2^{nd}$ electronic device. In the same meaning, if the display angle information included in the $1^{st}$ screen mode information is set along portrait orientation of the screen of the $1^{st}$ electronic device, the $1^{st}$ electronic device may transmit the display angle information of the portrait orientation screen to the $2^{nd}$ electronic device. Furthermore, the screen mode information may include at least one of (i) an indication of any new screen resolution value that is selected by the $1^{st}$ electronic device based on the requested screen orientation, (ii) indication of any new color depth value that is selected by the $1^{st}$ electronic device based on the requested screen orientation; and (iii) an indication of any other value in the logical screen data structure that is altered as a result of the request to change the screen orientation.

After that, the $1^{st}$ electronic device may adjust a layout of the screen (Step 606). For example, if the $1^{st}$ electronic device receives from the $2^{nd}$ electronic device a request for rotating the $1^{st}$ screen that is being displayed in the display module of the $2^{nd}$ electronic device by 180 degrees, the $1^{st}$ electronic device may rotate the $1^{st}$ screen that is being displayed in a display module of the $1^{st}$ electronic device by 180 degrees.

Figure 7:
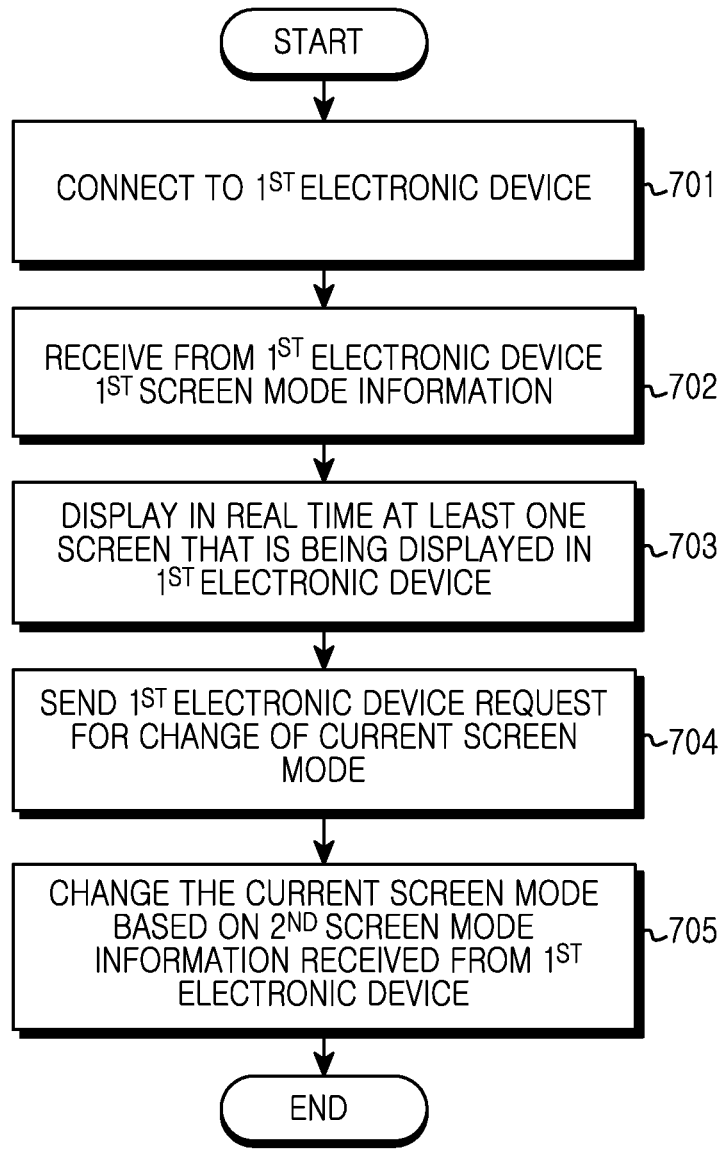
FIG. 7 is a flowchart of an example of a process, according to aspects of the disclosure.

FIG. 7 is a flowchart of an example of a process, according to aspects of the disclosure. As illustrated in FIG. 7, the $2^{nd}$ electronic device may detect that it is connected to a $1^{st}$ electronic device (Step 701). For example, the $1^{st}$ electronic device and the $2^{nd}$ electronic device may be connected to one another via an IP-based network such as a LAN, WiFi and the like.

Next, the $2^{nd}$ electronic device may receive from the $1^{st}$ electronic device $1^{st}$ screen mode information of at least one screen that is being displayed in the $1^{st}$ electronic device (Step 702). More particularly, the $2^{nd}$ electronic device may transmit a set of different resolution values that are compatible with the $2^{nd}$ electronic device to the $1^{st}$ electronic device, receive back an identification of a particular one of the set of resolution values that has been selected by the $1^{st}$ electronic device, and set the resolution of its display unit (e.g., touchscreen) to the value received from the $1^{st}$ electronic device. Although in this example the screen mode information includes an indication of a compatible resolution that is selected by the $1^{st}$ electronic device, the screen mode information may include any suitable type of screen data information and display angle information.

After that, the $2^{nd}$ electronic device may display in real time the at least one screen. In some implementations, the at least one screen may be displayed concurrently (and/or simultaneously) on both the $1^{st}$ electronic device and the $2^{nd}$ electronic device (Step 703). For example, if a $1^{st}$ screen and a $2^{nd}$ screen are being displayed in the $1^{st}$ electronic device, the $2^{nd}$ electronic device may display in real time at least one of the $1^{st}$ screen and the $2^{nd}$ screen in a display module of the $2^{nd}$ electronic device.

Next, the $2^{nd}$ electronic device may send the $1^{st}$ electronic device a request for change of the $1^{st}$ screen mode information (Step 704). For example, the $2^{nd}$ electronic device may send the $1^{st}$ electronic device a screen change request for rotating the $2^{nd}$ screen that is being presently displayed in the display module of the $2^{nd}$ electronic device by 90 degrees to the left (i.e., 270 degrees to the right).

After that, the $2^{nd}$ electronic device may change the at least one screen based on $2^{nd}$ screen mode information received from the $1^{st}$ electronic device (Step 705). In the aforementioned example, the $2^{nd}$ electronic device may rotate the $2^{nd}$ screen by 90 degrees to the left (i.e., 270 degrees to the right) and change a display angle of the $2^{nd}$ screen.

Figure 8:
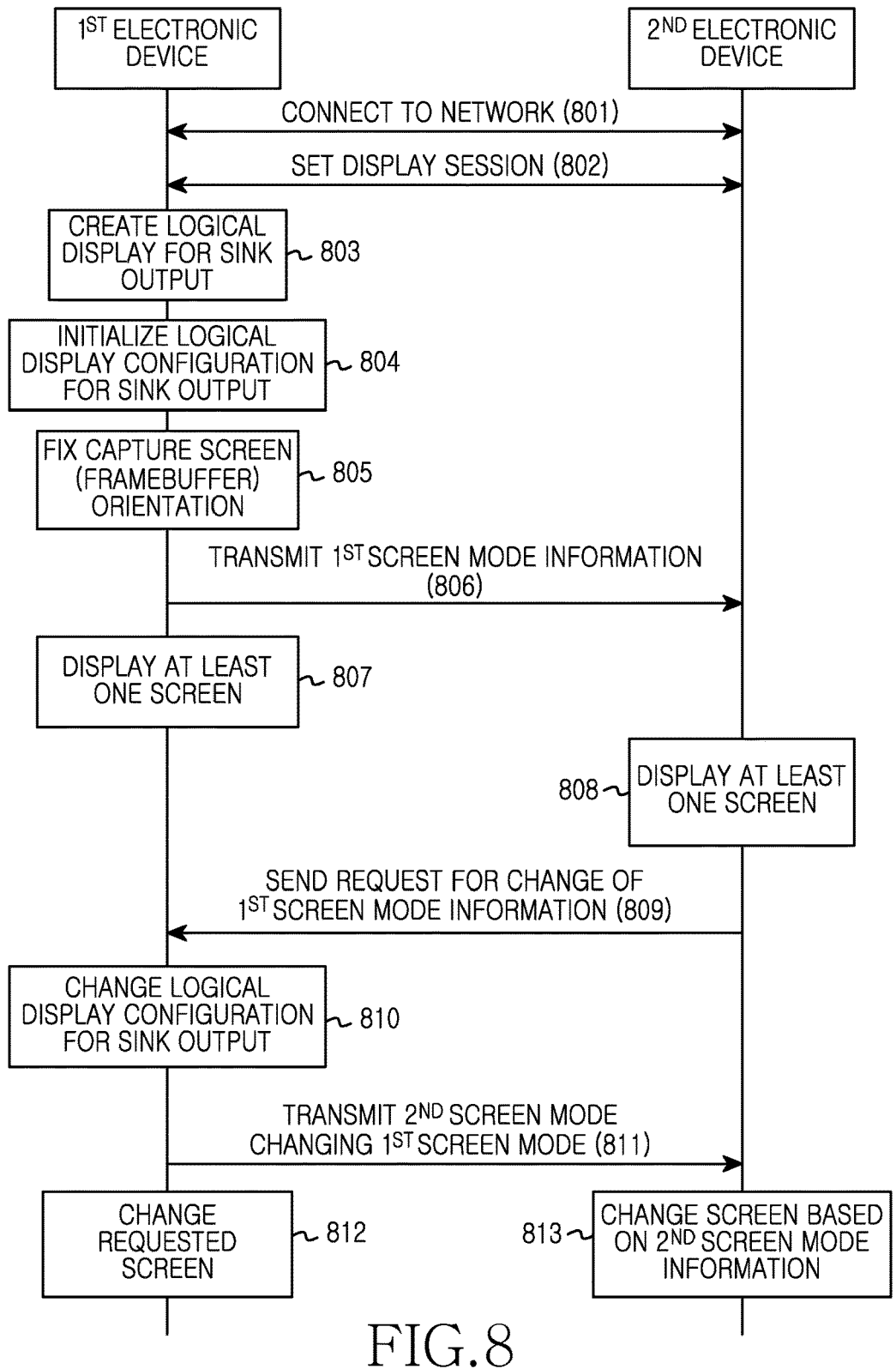
FIG. 8 is a sequence diagram of an example of a process, according to aspects of the disclosure.

FIG. 8 is a sequence diagram of an example of a process, according to aspects of the disclosure. As illustrated in FIG. 8, the $1^{st}$ electronic device and the $2^{nd}$ electronic device according to the present disclosure may be connected to one another. (Step 801). For example, the $1^{st}$ electronic device and the $2^{nd}$ electronic device may be connected to one another via an IP-based network such as a USB, a LAN, WiFi and the like.

After that, the $1^{st}$ electronic device and the $2^{nd}$ electronic device may set a display session (Step 802). More particularly, the $2^{nd}$ electronic device may transmit a set of resolution values compatible with the $2^{nd}$ electronic device to the $1^{st}$ electronic device, and receive from the $1^{st}$ electronic device an identification of a resolution value that is selected from the set by the $1^{st}$ electronic device.

Next, the $1^{st}$ electronic device may create a display data structure for sink output. After that, the $1^{st}$ electronic device may initialize a logical display configuration for sink output (Step 804). For example, the $1^{st}$ electronic device may set resolution information, color depth information and the like dependent on the current orientation of a screen of the $1^{st}$ electronic device.

Next, the $1^{st}$ electronic device may fix the orientation of a capture screen of the logical display (Step 805). In more detail, the $1^{st}$ electronic device may fix the capture screen of the logical display to landscape orientation or portrait orientation.

After that, the $1^{st}$ electronic device may transmit to the $2^{nd}$ electronic device $1^{st}$ screen mode information of at least one screen that is being displayed in the $1^{st}$ electronic device (Step 806). For example, the $1^{st}$ screen mode information may be screen data information and display angle (e.g., orientation) information about the at least one screen based on the resolution set to the $2^{nd}$ electronic device.

Next, the $1^{st}$ electronic device may display at least one screen (Step 807). For example, the $1^{st}$ electronic device may receive a selection of any one of a plurality of applications installed in the $1^{st}$ electronic device, and display a screen including the selected application.

After that, the $2^{nd}$ electronic device may display the at least one screen (Step 808). In more detail, the at least screen that is being presently displayed in a display module of the $1^{st}$ electronic device may be concurrently displayed in a display module of the $2^{nd}$ electronic device.

Next, the $2^{nd}$ electronic device may send the $1^{st}$ electronic device a request for change of the $1^{st}$ screen mode information (Step 809). For example, the $2^{nd}$ electronic device may send the $1^{st}$ electronic device a screen change request for rotating the $2^{nd}$ screen that is being presently displayed in the display module of the $2^{nd}$ electronic device by 90 degrees to the left (i.e., 270 degrees to the right).

Next, the $1^{st}$ electronic device may change the logical display data structure based on the screen change request (Step 810). That is, the $1^{st}$ electronic device may change the resolution information, the color depth information and the like based on the requested orientation.

After that, the $1^{st}$ electronic device may transmit to the $2^{nd}$ electronic device $2^{nd}$ rotation information dependent on the screen to be changed responsive to the received screen change request (Step 811). Here, the $2^{nd}$ rotation information may be screen data information and display angle information about the requested screen based on a resolution that will be changed with a variation of a display angle of the screen having received the screen change request from the $2^{nd}$ electronic device.

Next, the $1^{st}$ electronic device may change the requested screen (Step 812). For example, if the $1^{st}$ electronic device receives from the $2^{nd}$ electronic device a request for rotating a $1^{st}$ screen that is being displayed in the display module of the $2^{nd}$ electronic device by 180 degrees, the $1^{st}$ electronic device may rotate the $1^{st}$ screen that is being displayed in the display module of the $1^{st}$ electronic device by 180 degrees.

Next, the $2^{nd}$ electronic device may change the screen based on the $2^{nd}$ screen mode information (Step 813). For example, if the $2^{nd}$ electronic device sends the $1^{st}$ electronic device the request for changing the $1^{st}$ screen that is being displayed in the display module of the $2^{nd}$ electronic device by 180 degrees, the $2^{nd}$ electronic device may rotate the $1^{st}$ screen by 180 degrees and change the orientation of the $1^{st}$ screen.

Figure 9:
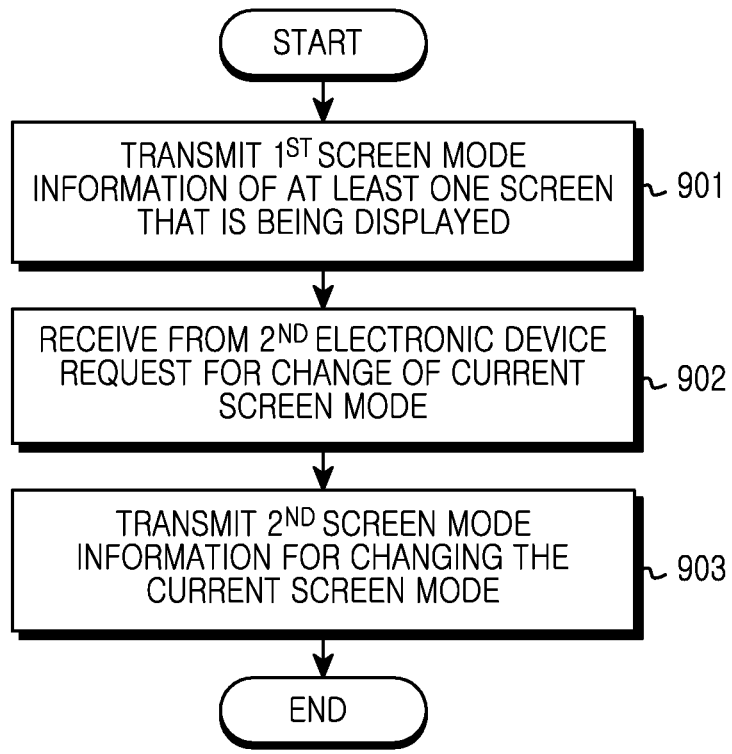
FIG. 9 is a flowchart of an example of a process, according to aspects of the disclosure.

FIG. 9 is a flowchart of a process, according to aspects of the disclosure. As illustrated in FIG. 9, the $1^{st}$ electronic device can transmit $1^{st}$ screen mode information of at least one screen that is being displayed in the $1^{st}$ electronic device to the $2^{nd}$ electronic device (Step 901). Here, the $1^{st}$ screen mode information can be screen data information and orientation information corresponding to the at least one screen.

After that, the $1^{st}$ electronic device may receive a request for change of the Pt screen mode information from the $2^{nd}$ electronic device (Step 902). For example, the $1^{st}$ electronic device may receive from the $2^{nd}$ electronic device a request for rotating a $1^{st}$ screen that is being presently displayed in a display module of the $2^{nd}$ electronic device by 180 degrees.

Next, the $1^{st}$ electronic device can transmit a $2^{nd}$ screen mode changing a $1^{st}$ screen mode to the $2^{nd}$ electronic device (Step 903). For example; the $2^{nd}$ screen mode information may be screen data information and orientation information.

Figure 10:
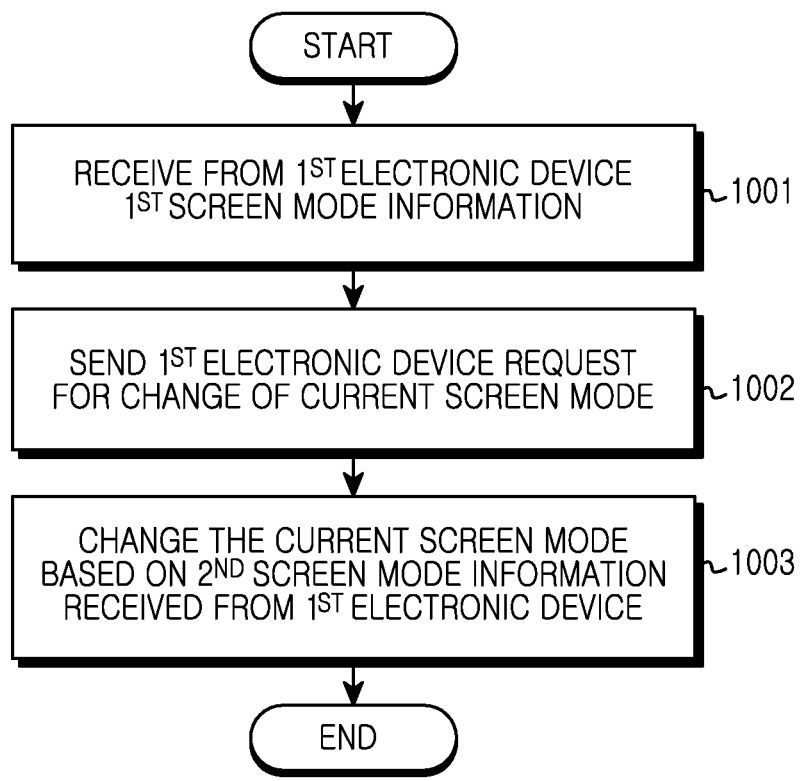
FIG. 10 is a flowchart of an example of a process, according to aspects of the disclosure.

FIG. 10 is a flowchart of an example of a process, according to aspects of the disclosure. As illustrated in FIG. 10, the $2^{nd}$ electronic device can receive from a $1^{st}$ electronic device $1^{st}$ screen mode information of at least one screen that is being displayed in the $1^{st}$ electronic device (Step 1001). For example, the $1^{st}$ screen mode information can be screen data information and display angle information (e.g., orientation) about the at least one screen based on a resolution set to the $2^{nd}$ electronic device.

Next, the $2^{nd}$ electronic device may send the $1^{st}$ electronic device a request for change of the received $1^{st}$ screen mode information (Step 1002). For example, the $2^{nd}$ electronic device may send the $1^{st}$ electronic device a screen change request for rotating the $2^{nd}$ screen that is being presently displayed in the display module of the $2^{nd}$ electronic device by 90 degrees to the left (i.e., 270 degrees to the right).

After that, the $2^{nd}$ electronic device may change any one screen based on $2^{nd}$ screen mode information received from the $1^{st}$ electronic device (Step 1003). For example, the $2^{nd}$ electronic device may rotate the $2^{nd}$ screen by 90 degrees to the left (i.e., 270 degrees to the right) and change a display angle of the $2^{nd}$ screen.

Figure 11A:
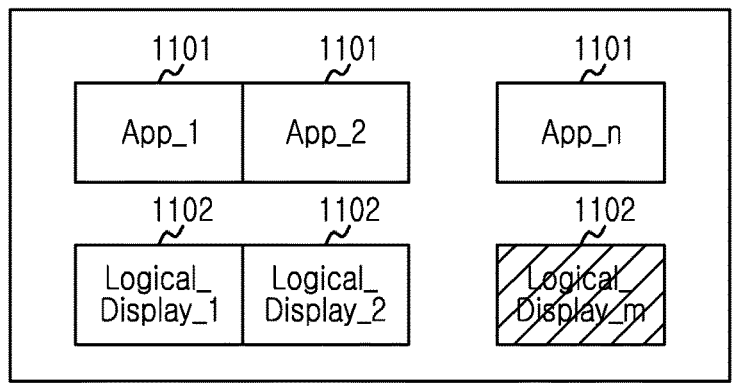
FIG. 11A is a block diagram of an example of an electronic device, according to aspects of the disclosure.

FIG. 11A is a block diagram of an example of a $1^{st}$ electronic device according to aspects of the disclosure. As illustrated, in this example, the $1^{st}$ electronic device is arranged to execute a plurality of applications 1101. For each application, the $1^{st}$ electronic device stores in memory a different display data structure 1102. As noted above, each display data structure may include one or more parameters specifying how content corresponding to the data structure's respective application (e.g., content generated by the application) is to be encoded. For example, a given one of the display data structures may specify any suitable screen characteristic, such as a screen angle (e.g., screen orientation), a color depth, a resolution (e.g., pixel density), an audio codec, a video codec, etc. In some implementations, each of the display data structures may be associated with a different $2^{nd}$ device (e.g., sink device).

In operation, the $1^{st}$ electronic device may capture data corresponding to a given one of the applications 1101. Next, the $1^{st}$ electronic device may encode the captured data based on information included in the application's corresponding logical screen data structure to generate an encoded data stream. And finally, the $1^{st}$ electronic device may transmit the encoded data stream to a $2^{nd}$ device (e.g., sink device) associated with the display data structure that is used to encode the data stream. As used throughout the disclosure, the term "data stream" may refer to any set of packets that is fed to a given $2^{nd}$ device. In some implementations, the transmitted data stream may include any suitable type of data that can be used for screen sharing. For example, in some implementations, the data stream may encode images of the given application's graphical user interface and/or information that is displayed inside the user interface.

Although in this example, each display data structure 1102 is used to encode only data that corresponds to a given one of the applications 1101 (e.g., data generated by the given application), in other implementations, any of the display data structures can be used to encode the entire content that is currently displayed on the $1^{st}$ device's display screen. This content, as can be easily appreciate, may include data corresponding to multiple applications and/or any other type of data that might be displayed on the $1^{st}$ electronic device.

Figure 11B:
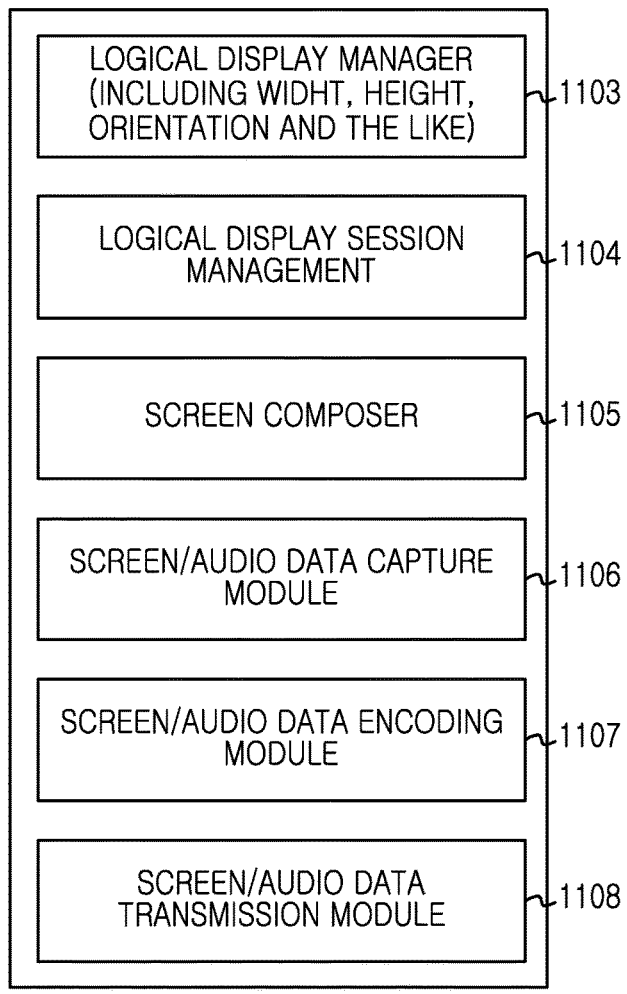
FIG. 11B is a block diagram of an example of an electronic device, according to aspects of the disclosure.

FIG. 11B is a diagram of the $1^{st}$ electronic device, according to aspects of the disclosure. As illustrated, the $1^{st}$ electronic device may include module 1103-1108. According to aspects of the disclosure, the modules 1103-1108 may be implemented using one/or more processors.

First, a logical display manager 1103 manages information of a logical display of a sink device, i.e., a width, a height, a refresh rate (i.e., a Frame Per Second (FPS)), and a color depth (dpi).

A logical display session manager 1104 performs management (i.e., connection, disconnection or the like) of a display session with the sink device.

A screen composer 1105 composes a screen to be displayed on the logical display of the sink device.

A screen/audio data capture module 1106 captures or reads the screen to be displayed on the logical display of the sink device.

A screen/audio data encoding module 1107 encodes the screen to be displayed on the logical display of the sink device.

A screen/audio data transmission module 1108 transmits encoded data to the sink device.

Figure 12:
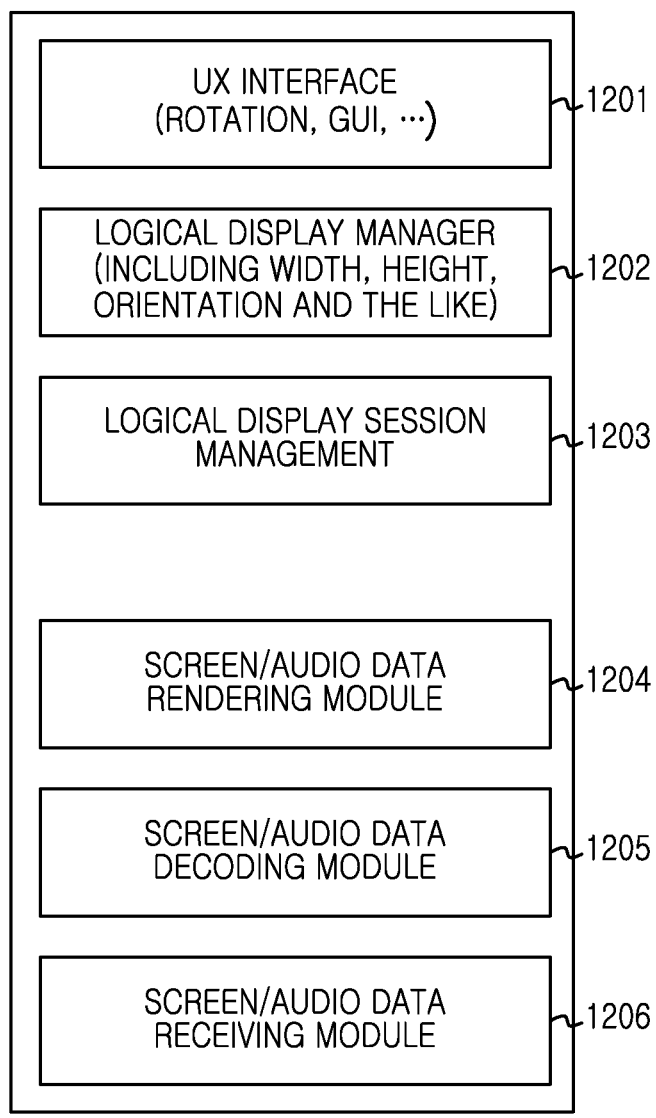
FIG. 12 is a diagram of an electronic device, according to aspects of the disclosure.

FIG. 12 is a diagram of a $2^{nd}$ electronic device, according to aspects of the disclosure.

A User eXperience (UX) interface 1201 includes a user interface for picture drawing and screen rotation received from a source device.

A logical display manager 1202 manages information of a logical display of a sink device connected with the source device, i.e., a width, a height, a refresh rate (i.e., an FPS), and a color depth (dpi).

A logical display session manager 1203 performs management (i.e., connection, disconnection or the like) of a logical display session of the sink device connected with the source device.

A screen/audio data rendering module 1204 renders screen data to a screen display region of the sink device.

A screen/audio data decoding module 1205 decodes received data.

A screen/audio data receiving module 1206 receives data.

Figure 13:
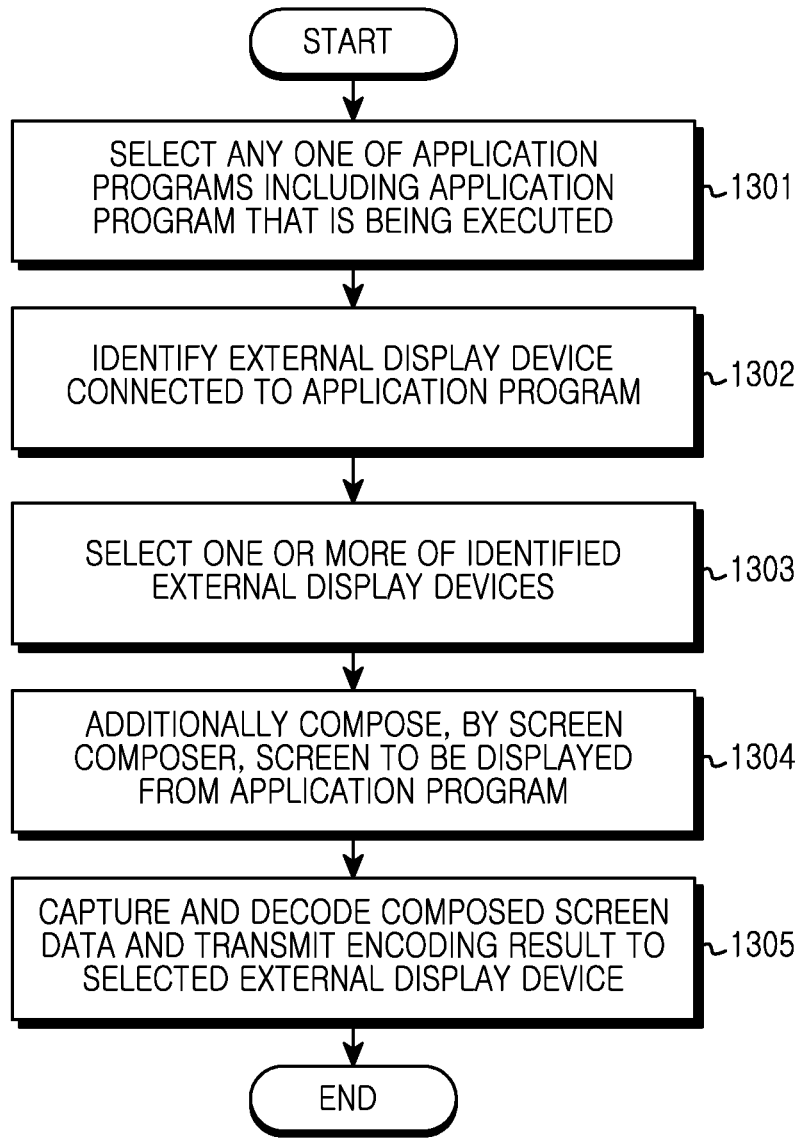
FIG. 13 is a flowchart of an example of a process, according to aspects of the disclosure.

FIG. 13 is a flowchart of an example of a process for processing and composing a screen of an application program in a state in which a 1$^{st}$ electronic device is connected with a plurality of 2$^{nd}$ electronic devices, according to aspects of the disclosure.

First, the 1$^{st}$ electronic device may select any one of application programs including application programs that are being executed (Step 1301). In more detail, the 1$^{st}$ electronic device may receive a selection of any one of installed application programs from a user, or may receive a selection of any one of application programs that are being already executed.

After that, the 1$^{st}$ electronic device may identify an external display device connected to the selected application program (Step 1302). In more detail, the 1$^{st}$ electronic device may identify a 2$^{nd}$ electronic device connected to the selected application program among a plurality of 2$^{nd}$ electronic devices.

Next, the 1$^{st}$ electronic device may select one or more of the identified external display devices (Step 1303). That is, the 1$^{st}$ electronic device may select one or more 2$^{nd}$ electronic devices among the identified plurality of 2$^{nd}$ electronic devices.

After that, a screen composer of the 1$^{st}$ electronic device may additionally compose a screen to be displayed from the application program (Step 1305). That is, the screen composer of the 1$^{st}$ electronic device may additionally compose the screen to be displayed from the application program besides a screen that is being presently displayed.

Next, the 1$^{st}$ electronic device may capture and encode composed screen data and transmit the encoding result to the selected external display device (Step 1304). That is, the 1$^{st}$ electronic device may capture and encode screen data about the additionally composed screen, and transmit the encoding result to one or more 2$^{nd}$ electronic devices selected by the 1$^{st}$ electronic device.

According to aspects of the disclosure, in a connection process of at least one 1$^{st}$ electronic device and a 2$^{nd}$ electronic device, a display device is searched from the Pt electronic device or the 2$^{nd}$ electronic device through a wired/wireless network, and the 1$^{st}$ and 2$^{nd}$ electronic devices exchange resolution and audio/video codec information to be displayed to the 2$^{nd}$ electronic device through a display session negotiation process, and a display session is set up by a negotiated resolution and codec, and external display information (i.e., a resolution, a DPI, and an angle) including a screen buffer to be outputted to the 2$^{nd}$ electronic device is created, and screen mode information (i.e., landscape/portrait orientation or an angle) of a screen corresponding to the 2$^{nd}$ electronic device is transmitted, and a screen to be displayed to the 2$^{nd}$ electronic device is captured adaptive to a transmission screen mode (e.g., landscape orientation fixing) based on a negotiated resolution and is transmitted in real time.

In an operation method of a 1$^{st}$ electronic device connected with at least one 2$^{nd}$ electronic device in rotation processing of the present disclosure, the operation method includes the processes of transmitting to the 2$^{nd}$ electronic device screen mode (landscape/portrait orientation or an angle) information of the 1$^{st}$ electronic device of at least one screen that is being displayed, receiving from the 2$^{nd}$ electronic device a request for mode change of any one screen among the at least one screen, changing a screen mode of an external display corresponding to the 2$^{nd}$ electronic device and notifying the screen mode change to an application program, recognizing a notification of screen mode change in an application program of drawing a picture in a logical external display corresponding to the 2$^{nd}$ electronic device and changing a picture drawing scheme (i.e., a landscape mode scheme or a portrait mode scheme), transmitting to the 2$^{nd}$ electronic device 2$^{nd}$ rotation information dependent on a screen to be changed responsive to the received screen change request, and capturing a screen to be displayed to the 2$^{nd}$ electronic device adaptively to a negotiated resolution based transmission screen mode (e.g., landscape orientation fixing) and transmitting the captured screen.

According to aspects of the disclosure, the present disclosure includes the processes of, in a state in which a 1$^{st}$ electronic device and one or more (a plurality of) 2$^{nd}$ electronic devices have been already connected, selecting by a user an application program in the 1$^{st}$ electronic device and executing the application program, identifying connected external display devices in the application program, selecting an external display device for output in the application program, additionally including and composing by a screen composer for external display a screen of a corresponding application, capturing composed screen data adaptively to a negotiated resolution based transmission screen mode (e.g., landscape orientation fixing), encoding screen data, and transmitting the encoding result.

According to aspects of the disclosure, the present disclosure includes the processes of, in a state in which a 1st electronic device and one or more (a plurality of) 2nd electronic devices have been already connected and a plurality of application programs are executed, selecting by a user an application program that is being executed in the 1st electronic device, identifying a connected external display device, selecting an external display in which an application program is executed, additionally including and composing by a screen composer for external display a screen of a corresponding application, capturing composed screen data adaptively to a negotiated resolution based transmission screen mode (e.g., landscape orientation fixing), encoding screen data, and transmitting the encoding result.

According to aspects of the disclosure, an operation method of a 1$^{st}$ electronic device connected with at least one 2$^{nd}$ electronic device, the method comprising the processes of transmitting to the 2$^{nd}$ electronic device 1$^{st}$ screen mode information of at least one screen that is being displayed in the 1$^{st}$ electronic device, receiving a request for change of the transmitted 1$^{st}$ screen mode information from the 2$^{nd}$ electronic device, and transmitting to the 2$^{nd}$ electronic device a 2$^{nd}$ screen mode changing a Pt screen mode. Further comprising the processes of exchanging at least one information among resolution information, audio codec information and video codec information to be displayed to the 2$^{nd}$ electronic device, with the 2$^{nd}$ electronic device through a session negotiation, setting up a display session from the negotiated resolution information, audio codec information and video codec information, creating display information to be outputted to the 2$^{nd}$ electronic device, and fixing a screen mode to be displayed to the 2$^{nd}$ electronic device, to any one orientation among landscape orientation and portrait orientation. Wherein the display information is at least one information among resolution information, Dots Per Inch (DPI) information, and angle information. Wherein the 1$^{st}$ screen mode information is screen data information and display angle information about the at least one screen based on a resolution set to the 2$^{nd}$ electronic device. Wherein the 2$^{nd}$ screen mode information is screen data information and display angle information based on a resolution that will be changed with a variation of the 1$^{st}$ screen mode information. Further comprising the process of transmitting in real time video data and audio data dependent on the 2$^{nd}$ screen mode. Further comprising the processes of identifying 2$^{nd}$ electronic devices connected to selected any one application program among the at least one 2$^{nd}$ electronic device, selecting one or more 2$^{nd}$ electronic devices among the identified 2$^{nd}$ electronic devices, additionally composing a screen to be displayed by the application program, and capturing and encoding composed screen data and transmitting the encoding result to the selected 2$^{nd}$ electronic devices.

According to aspects of the disclosure, an operation method of at least one 2$^{nd}$ electronic device connected with a 1$^{st}$ electronic device, the method comprising the processes of, receiving 1$^{st}$ screen mode information of at least one screen that is being displayed in the 1$^{st}$ electronic device, from the 1$^{st}$ electronic device, sending the 1$^{st}$ electronic device a request for change of the received 1$^{st}$ screen mode information, and changing any one screen that is being displayed in the 2$^{nd}$ electronic device, based on 2$^{nd}$ screen mode information received from the 1$^{st}$ electronic device. Further comprising the processes of exchanging at least one information among resolution information, audio codec information and video codec information to be displayed to the 1$^{st}$ electronic device, with the 1$^{st}$ electronic device through a session negotiation, and setting up a display session from the negotiated resolution information, audio codec information and video codec information. Wherein the 1$^{st}$ screen mode information is screen data information and display angle information about the at least one screen based on a resolution set to the 2$^{nd}$ electronic device. Wherein the 2$^{nd}$ screen mode information is screen data information and display angle information based on a resolution that will be changed with a variation of the 1$^{st}$ screen mode information. Further comprising the processes of receiving data about the at least one screen that is being displayed in the 1$^{st}$ electronic device, from the 1$^{st}$ electronic device, and displaying in real time the at least one screen based on the received data. Further comprising the process of receiving in real time video data and audio data dependent on a 2$^{nd}$ screen mode.

According to aspects of the disclosure, a 1$^{st}$ electronic device connected with at least one 2$^{nd}$ electronic device, the device comprising a processor configured to control a general operation, and a communication module configured to transmit/receive data controlled in the processor with the 2$^{nd}$ electronic device, wherein the communication module transmits to the 2$^{nd}$ electronic device 1$^{st}$ screen mode information of at least one screen that is being displayed in the 1$^{st}$ electronic device, receives a request for change of the transmitted 1$^{st}$ screen mode information from the 2$^{nd}$ electronic device, and transmits to the 2$^{nd}$ electronic device a 2$^{nd}$ screen mode changing a 1$^{st}$ screen mode at least. Wherein the communication module exchanges at least one information among resolution information, audio codec information and video codec information to be displayed to the 2$^{nd}$ electronic device, with the 2$^{nd}$ electronic device through a session negotiation, and wherein the processor sets up a display session from the negotiated resolution information, audio codec information and video codec information, creates display information to be outputted to the 2$^{nd}$ electronic device, and fixes a screen mode to be displayed to the 2$^{nd}$ electronic device, to any one orientation among landscape orientation and portrait orientation. Wherein the display information is at least one information among resolution information, Dots Per Inch (DPI) information, and angle information. Wherein the 1$^{st}$ screen mode information is screen data information and display angle information about the at least one screen based on a resolution set to the 2$^{nd}$ electronic device. Wherein the 2$^{nd}$ screen mode information is screen data information and display angle information based on a resolution that will be changed with a variation of the 1$^{st}$ screen mode information. Wherein the communication module transmits in real time video data and audio data dependent on the 2$^{nd}$ screen mode. Wherein the processor identifies 2$^{nd}$ electronic devices connected to selected any one application program among the at least one 2$^{nd}$ electronic device, and selects one or more 2$^{nd}$ electronic devices among the identified 2$^{nd}$ electronic devices, and wherein the communication module captures and encodes composed screen data, and transmits the encoding result to the selected 2$^{nd}$ electronic devices, further comprising a screen composer configured to additionally compose a screen to be displayed by the application program.

According to aspects of the disclosure, at least one 2$^{nd}$ electronic device connected with a 1$^{st}$ electronic device, the device comprising a communication module configured to receive 1$^{st}$ screen mode information of at least one screen that is being displayed in the 1$^{st}$ electronic device, from the 1$^{st}$ electronic device, and sending the 1$^{st}$ electronic device a request for change of the received 1$^{st}$ screen mode information, and a processor configured to change any one screen that is being displayed in the 2$^{nd}$ electronic device, based on 2$^{nd}$ screen mode information received from the 1$^{st}$ electronic device. Wherein the communication module exchanges at least one information among resolution information, audio codec information and video codec information to be displayed to the 1$^{st}$ electronic device, with the 1$^{st}$ electronic device through a session negotiation, and wherein the processor sets up a display session from the negotiated resolution information, audio codec information and video codec information. Wherein the 1$^{st}$ screen mode information is screen data information and display angle information about the at least one screen based on a resolution set to the 2$^{nd}$ electronic device. Wherein the 2$^{nd}$ screen mode information is screen data information and display angle information based on a resolution that will be changed with a variation of the 1$^{st}$ screen mode information. Wherein the communication module receives data about the at least one screen that is being displayed in the 1$^{st}$ electronic device, from the 1$^{st}$ electronic device, further comprising a display module configured to display in real time the at least one screen based on the received data. Wherein the communication module receives in real time video data and audio data dependent on a 2$^{nd}$ screen mode.

According to aspects of the disclosure, an electronic device comprising a processor configured to identify one or more sink devices, generate a respective logical display data structure for each sink device, generate a respective data stream for each sink device, the respective data stream being generated by encoding content produced by one or more applications based on the respective logical display data structure of the sink device, and transmit, to each of the sink devices, the sink device's respective encoded data stream. Further comprising detecting input associating each of the sink devices with a different one of a plurality of applications, wherein each sink device's respective data stream is generated based on the application associated with the sink device. Further comprising receiving screen rotation request from a first one of the sink devices, and modifying the respective logical display data structure of the first one of the sink devices to include a screen orientation that is indicated by the screen rotation request. Wherein each sink device's respective logical display data structure is generated based on a screen attribute that is received from that sink device.

According to aspects of the disclosure, a method comprising identifying a first sink device by a source device, encoding at least a portion of content corresponding to one or more applications running on the source device to produce a first data stream, the first data stream being generated based on a first logical display data structure and transmitting the first data stream to the first sink device. Wherein the first logical display data structure is generated based on an indication of a screen characteristic that is received from the first sink device. Wherein the screen characteristic includes at least one of a screen resolution, screen orientation, dots per inch (DPI), a video codec that is supported by the first device. Further comprising receiving, from the first sink device, a request to change a first screen characteristic of the data stream to a desired first value, modifying the logical display data structure to include an indication of a second value of a second screen characteristic, and transmitting the second value to the first sink device, wherein modifying the logical display data structure causes the data stream to be encoded in accordance with the second value of the second screen characteristic. Further comprising detecting an input associating the first sink device with a first application that is executed by the source device, wherein the first data stream is produced by only encoding content corresponding to the first application. Wherein the first data stream is encoded according to a first screen resolution value, the method further comprising, receiving a first screen rotation request from the first sink device, the first screen rotation request identifying a desired screen orientation, identifying a second screen resolution based on the desired screen orientation, transmitting an indication of the second resolution to the first sink device, and modifying the first logical display data structure to identify at least one of the desired screen orientation and the second screen resolution. Further comprising, identifying a second sink device, generating a second logical display data structure, encoding at least some of the content to produce a second data stream, the second data stream being generated based on the second logical display data structure, and transmitting the second data stream to the second sink device. Further comprising, receiving: (i) a first indication of a first display characteristic from the first sink device, and (ii) a second indication of a second display characteristic from the second sink device, detecting: (i) a first input associating the first sink device with a first application that is executed by the source device, and (ii) a second input associating the second sink device with a second application that is executed by the source device, wherein the first logical display data structure is generated based on the first indication and the second logical display data structure is generated based on the second logical display data structure, and wherein the first data stream is produced by only encoding content corresponding to the first application and the second data stream is produced by only encoding content corresponding to the second application.

According to aspects of the disclosure, an electronic device comprising a processor configured to identify a first sink device, encode at least a portion of content corresponding to one or more applications to produce a first data stream, the first data stream being generated based on a first logical display data structure, and transmit the first data stream to the first sink device. Wherein the processor is further configured to generate the first logical display data structure based on an indication of a screen characteristic that is received from the first sink device. Wherein the screen characteristic includes at least one of a screen resolution, screen orientation, dots per inch (DPI), and a video codec that is supported by the first device. Wherein the processor is further configured to receive, from the first sink device, a request to change a first screen characteristic of the data stream to a desired first value, modify the logical display data structure to include an indication of a second value of a second screen characteristic, and transmit the second value to the first sink device, wherein modifying the logical display data structure causes the data stream to be encoded in accordance with the second value of the second screen characteristic. Wherein the processor is further configured to detect an input associating the first sink device with a first application, wherein the first data stream is produced by only encoding content corresponding to the first application. Wherein the first data stream is encoded according to first screen resolution value and the processor is further configured to receive a first screen rotation request from the first sink device, the first screen rotation request identifying a desired screen orientation, identify a second screen resolution based on the desired screen orientation, transmit an indication of the second resolution to the first sink device, and modify the first logical display data structure to identify at least one of the desired screen orientation and the second screen resolution. Wherein the processor is further configured to identify a second sink device, generate a second logical display data structure, encode at least some of the content to produce a second data stream, the second data stream being generated based on the second logical display data structure, and transmit the second data stream to the second sink device. Further comprising, receive: (i) a first indication of a first display characteristic from the first sink device, and (ii) a second indication of a second display characteristic from the second sink device, detect: (i) a first input associating the first sink device with a first application that is executed by the processor, and (ii) a second input associating the second sink device with a second application that is executed by the processor, wherein the first logical display data structure is generated based on the first indication and the second logical display data structure is generated based on the second logical display data structure, and wherein the first data stream is produced by only encoding content corresponding to the first application and the second data stream is produced by only encoding content corresponding to the second application.

FIGS. 1-13 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

While present disclosure has been shown and described with reference to certain preferred embodiments thereof, it will be understood by those skilled in the art that various changes in form and details may be made therein without departing from the spirit and scope of present disclosure as defined by the appended claims.

What is claimed is:

1. A method of a first electronic device comprising:
   displaying a first screen related to a first application with a first display angle;
   transmitting, to a second electronic device, first screen data corresponding to the first screen to display the first screen on the second electronic device based on the first display angle;
   receiving, from the second electronic device, a signal requesting to change the first display angle of the first screen to a second display angle;
   changing the first screen of the first electronic device to a second screen based on the second display angle; and
   transmitting, to the second electronic device, second screen data corresponding to the second screen of the first electronic device and the second display angle such that the second electronic device changes, based on the second display angle and the second screen data, the first screen of the second electronic device to the second screen.

2. The method of claim 1, further comprising:
   generating the first screen data by composing data for at least one application running on the first electronic device; and
   transmitting the first screen data to the second electronic device.

3. The method of claim 2, further comprising:
   connecting a session with the second electronic device for transmitting the first screen data to the second electronic device; and
   receiving, from the second electronic device, resolution information compatible with the second electronic device.

4. The method of claim 1, further comprising transmitting at least one of a screen resolution, screen orientation, dots per inch (DPI), or a video codec to the second electronic device.

5. The method of claim 2, further comprising detecting an input associating the second electronic device with a first application that is executed by the first electronic device, wherein the first screen data is produced by only encoding content corresponding to the first application.

6. The method of claim 2, wherein the first screen data is encoded according to the first display angle and a first screen resolution value, and
   wherein the second screen data further comprises a second screen resolution value.

7. The method of claim 1, further comprising:
   transmitting, to a third electronic device, third screen data corresponding to a third screen to display the third screen on the third electronic device, the third screen is related to a second application that is different from the first application, and is displayed on the third electronic device based on the first display angle;
   receiving, from the third electronic device, a signal requesting to change the first display angle of the third screen to the second display angle;
   changing the third screen of the first electronic device to a fourth screen based on the second display angle; and
   transmitting, to the third electronic device, fourth screen data corresponding to the fourth screen of the first electronic device and the second display angle such that the third electronic device changes, based on the second display angle and the fourth screen data, the third screen of the third electronic device to the fourth screen.

8. The method of claim 1, further comprising receiving information for a resolution value of the second electronic device via at least one of universal serial bus (USB), local area network (LAN), and wireless fidelity (WiFi).

9. A first electronic device comprising:
   a communication interface; and
   a processor configured to:
   display a first screen related to a first application with a first display angle,
   transmit, to a second electronic device, first screen data corresponding to the first screen to display the first screen on the second electronic device based on the first display angle,
   receive, from the second electronic device, a signal requesting to change the first display angle of the first screen to a second display angle,
   change the first screen of the first electronic device to a second screen based on the second display angle, and
   transmit, to the second electronic device, second screen data corresponding to the second screen of the first electronic device and the second display angle such that the second electronic device changes, based on the second display angle and the second screen data, the first screen of the second electronic device to the second screen.

10. The electronic device of claim 9, wherein the processor is further configured to:

generate the first screen data by composing data for at least one application running on the first electronic device, and
transmit the first screen data to the second electronic device.

11. The electronic device of claim 10, wherein the processor is further configured to:
connect a session with the second electronic device for transmitting the first screen data to the second electronic device, and
receive, from the second electronic device, resolution information compatible with the second electronic device.

12. The electronic device of claim 10, wherein the processor is further configured to:
detect an input associating the second electronic device with a first application that is executed by the first electronic device, wherein the first screen data is produced by only encoding content corresponding to the first application.

13. The electronic device of claim 10, wherein the first screen data is encoded according to the first display angle and a first screen resolution value, and
wherein the second screen data further comprises a second screen resolution value.

14. The electronic device of claim 9, wherein the processor is further configured to:
transmit, to a third electronic device, third screen data corresponding to a third screen to display a third screen on the third electronic device, the third screen is related to a second application that is different from the first application, and is displayed on the third electronic device based on the first display angle,
receive, from the third electronic device, a signal requesting to change the first display angle of the third screen of the third electronic device to the second display angle,
change the third screen of the first electronic device to a fourth screen based on the second display angle, and
transmit, to the third electronic device, fourth screen data corresponding to the fourth screen of the first electronic device and the second display angle such that the third electronic device changes, based on the second display angle and the fourth screen data, the third screen of the third electronic device to the fourth screen.

15. The electronic device of claim 9, wherein the processor is further configured to transmit at least one of a screen resolution, screen orientation, dots per inch (DPI), or a video codec to the second electronic device.

16. The electronic device of claim 9, wherein the processor is further configured to receive information for a resolution value of the second electronic device via at least one universal serial bus (USB), local area network (LAN), and wireless fidelity (WiFi).

17. A second electronic device comprising:
a communication interface; and
a processor configured to:
receive, from a first electronic device, first screen data corresponding to a first screen displayed on the first electronic device, and display the first screen based on a first display angle,
transmit, to the first electronic device, a signal requesting to change the first display angle of the first screen of the second electronic device to a second display angle,
receive, from the first electronic device, second screen data, the second screen data corresponds to a second screen of the first electronic device changed by the requesting and the second display angle, and
change, based on the second display angle and the second screen data, the first screen displayed on the second electronic device to the second screen.

18. The second electronic device of claim 17, the processor is further configured to receive, from the first electronic device, the first screen data, wherein the first screen data is generated, by the first electronic device, by composing data for at least one application running on the first electronic device.

19. The electronic device of claim 18, the processor is further configured to:
connect a session with the first electronic device for receiving the first screen data from the first electronic device, and
transmit, to the first electronic device, resolution information compatible with the second electronic device.

20. The electronic device of claim 17, wherein the processor is further configured to transmit at least one of a screen resolution, screen orientation, dots per inch (DPI), or a video codec.

* * * * *